United States Patent
Fukunaga et al.

[11] Patent Number: 6,088,037
[45] Date of Patent: Jul. 11, 2000

[54] RENDERING PROCESSOR

[75] Inventors: Yasushi Fukunaga; Ryo Fujita; Kazuyoshi Koga; Isao Yasuda; Takeshi Kato, all of Hitachi, Japan

[73] Assignee: Hitachi, Ltd., Tokyo, Japan

[21] Appl. No.: 08/715,472

[22] Filed: Sep. 18, 1996

Related U.S. Application Data

[63] Continuation of application No. 08/305,161, Sep. 13, 1994, abandoned, which is a continuation of application No. 07/634,818, Jan. 2, 1991, Pat. No. 5,371,839, which is a continuation of application No. 07/160,355, Feb. 25, 1988.

[30] Foreign Application Priority Data

| Feb. 27, 1987 | [JP] | Japan | ................................... | 62-42963 |
| Jul. 29, 1987 | [JP] | Japan | ................................... | 62-187561 |
| Jan. 8, 1988 | [JP] | Japan | ................................... | 63-1203 |

[51] Int. Cl.$^7$ .................................................... G06F 15/00
[52] U.S. Cl. ............................................................ 345/431
[58] Field of Search .................................. 395/133, 141; 345/433, 441, 440, 431, 430, 429, 150, 153, 154

[56] References Cited

U.S. PATENT DOCUMENTS

| 4,905,164 | 2/1990 | Chandler et al. | ........................ 364/518 |
| 5,371,840 | 12/1994 | Fischer et al. | ............................. 395/133 |
| 5,499,323 | 3/1996 | Doi et al. | ................................. 395/126 |
| 5,499,324 | 3/1996 | Nakayama | ............................... 395/126 |

FOREIGN PATENT DOCUMENTS

| 60-250479 | 12/1985 | Japan . |
| 61-121178 | 6/1986 | Japan . |
| 61-80193 | 4/1996 | Japan . |

*Primary Examiner*—Phu K. Nguyen
*Attorney, Agent, or Firm*—Antonelli, Terry, Stout & Kraus, LLP

[57] ABSTRACT

A rendering processor having a plurality of DDA control circuits such that in each DDA circuit, the coordinates of source and destination images and gradation values are computed. Depending on the computation result, source and destination data to the raster arithmetic unit are generated so as to control the raster arithmetic unit, which enables a plurality of pixels to be generated and to be written in the memory during a memory access.

15 Claims, 24 Drawing Sheets

15 —12 11 — 8 7 — 4 3 — 0
| ZHH | ZHL | ZLH | ZLL |  ~713
```

RENDERING PROCESSOR

BACKGROUND OF THE INVENTION

This application is a continuation of Ser. No. 08/305,161 Sep. 13, 1994 ABN which is a continuation of Ser. No. 07/634,818 Jan. 2, 1991 U.S. Pat. No. 5,371,839 which is a continuation of Ser. No. 07/160,355 Feb. 25, 1988.

The present invention relates to a rendering processor for generating data to be displayed on a display device of a display control apparatus, as a CRT display, and in particular, to a hardware system for generating images and three-dimensional data at a high speed. The present invention further relates to an apparatus which displays on a display an image with gradation generated by the rendering processor, and in particular, to an apparatus for displaying on a display images having different lightness luminance levels for the respective pixels associated with influence from illuminated light and the like.

Conventionally, for apparatuses to effect a display control, particularly to execute drawing processing, there have been proposed many processing systems.

For example, the Japanese Patent Unexamined Publication No. 59-229669 describes an example of processing to rotate an image in which coordinate values of a destination image are obtained corresponding to coordinates of lattice points of a source image. In this method, there does not appear any trouble if a DDA circuit for a line expansion is provided only for the (X, Y) coordinates of the destination; however, there actually exists problems that the processing performance is determined depending on the size of an image on the source side and that images of different lattice points are written or are not written at a destination lattice point many times in some cases.

The Japanese Patent Examined Publication No. 57-57715 describes a method in which gradation of each pixel is attained in a triangle for which a gradation value is beforehand assigned to a vertex of the triangle. According to this method, a shading operation on a graphic image is accomplished by a hardware system; however, since a memory access is necessary for each generation of a pixel, particularly, in the shading operation to generate pixels in a direction parallel to the raster, there arises a problem related to the processing performance.

The Japanese Patent Unexamined Publication No. 60-252394 discloses a patent related to a color image display apparatus, and particularly, to a color image display apparatus including a variable configuration of memory planes. In this method, the bus configuration with respect to the CPU can be kept unchanged regardless of the number of memory planes; however, there is not provided an independent arithmetic circuit for each memory plane, which leads to a problem of performance associated with operations, for example, for the image processing.

The prior art technologies above aim at a high-speed processing for a partial processing of the graphic or image processing, namely, the inventions are to be implemented only either in the graphic processing or the image processing.

However, since sophisticated or developed functions, a higher precision, and an expansion of the display screen are desired in the screen display operation, it is necessary to satisfy the requirements above and at the same time to reduce the response time for the screen display operation.

Furthermore, in order to effect a high-speed processing of a color image, there has been disclosed, for example, "an apparatus for accessing an image memory" in the Japanese Patent Application No. 59-30278 in which an arithmetic unit is disposed for each plane of the frame memory so as to effect a concurrent processing. However, in this prior art technology, a comprehensive arithmetic system sufficiently processing an image with gradation has not been considered; consequently, if it is desired to execute a gradation change processing to alter gradation of an image, the host processor (CPU) is required to achieve again a computation of the image, which leads to a problem that the real time change of the display cannot be carried out.

Next, referring to drawings, a detailed description will be given of requirements of application to clarify the problem above.

As shown in FIG. 27, image data A on the left-hand side is defined with gradation in a two-dimensional plane. When the image data A is subjected to a texture mapping processing to apply the image data A on the entire surfaces of a retangular parallel-piped as shown on the right-hand side so as to configure an image B, an image like an actual scene cannot be attained unless the mapping (image conversion or transform) is accomplished so as to develop a gradation difference between the rear side and the front side of the plane (or between the deeper side and the near side viewed from the side of the eyes of the user). Consequently, a higher density is assigned to the front side and a lower density is assigned to the rear side.

To implement this processing, for example, for pixels to be mapped onto the rear side, the value of each pixel of the gradation image on the two-dimensional plane are multiplied by 0.6 for the mapping operation; whereas for pixels to be mapped onto the front side, the value of each pixel of the gradation image on the two-dimensional plane are multiplied by 1.0 for the mapping operation; moreover, each pixel between the rear and front sides are required to be multiplied by (0.6–1.0) so as to take an intermediate value. As a result, the density of the portion of the image on the rear side becomes thinner than the original density thereof on the two-dimensional plane.

The density conversion in this processing is achieved by a host processor and hence a real time processing of the density conversion cannot be easily accomplished.

SUMMARY OF THE INVENTION

It is therefore an object of the present invention to provide a rendering processor in which a DDA control circuit mainly effecting a line expansion for graphics is connected to a raster operation hardware for an image so as to achieve the rendering processing of images and graphics at a high speed.

Another object of the present invention is to provide a rendering processor which minimizes the response time in the screen display operation and which can cope with development of the function and increase in the precision of the screen display operation.

Further another object of the present invention is to provide processor elements of a rendering processor which is suitable for increasing the precision of the screen display operation.

Still another object of the present invention is to provide a screen display controller which minimizes the response time of the screen display operation so as to develop a satisfactory operability.

Further another object of the present invention is to provide a display device in which luminance information of each gradation pixel undergoes an arithmetic processing so as to attain gradation images with different gradation levels on a display screen.

According to the present invention, there is provided an apparatus including a plurality of DDA control circuits wherein in each of the DDA circuits, coordinates of a source image, coordinates of a destination image, and gradation values associated therewith are computed so as to generate source and destination data to be supplied to a raster arithmetic unit depending on the computation result, thereby effecting a control of the arithmetic unit to obtain a plurality of pixels during a memory access and to effect a write operation thereof, which enables image and graphic processing to be achieved at a high speed.

In the DDA control circuits, there is disposed a hardware unit which can simultaneously generate the X-coordinate values of the source image, (X, Y) coordinate values of the destination image, the gradation values and Z-axis coordinate values of the desitination image. Depending on the values thus attained, means for generating raster information including 16 pixels to be written and for detecting a separation point of the 16 pixels controls an access to a frame memory such that data comprising up to 16 pixels can be written in the memory by a frame memory access.

According to the present invention, the reduction of the response time in the screen display operation as well as the development of the function and increase in the precision of the screen display operation can be accomplished by dividing the rendering processor to achieve processing for the frame memory into a plurality of processor elements and by providing synchronize means which synchronizes processing between said plurality of processor elements.

The processor elements of the rendering processor suitable for increasing the precision of the screen display operation are provided by constructing said plurality of processor elements each having the same structure in an LSI, by identifying a plurality of planes constituting the frame memory to be supervised by each processor element, and by disposing an identifier terminal indicating the plane individually effecting a data control.

The minimization of the response time and the high operability of the screen display operation can be achieved as follows. Namely, in a system having a keyboard, an input/output device effecting input/output operations with the keyboard, and a CPU achieving a data communication with a display control processor according to a predetermine program, there is disposed a rendering processor including a plurality of processor elements in the display control section which execute processing in a synchronous fashion with respect to the frame memory.

According to the present invention, a rendering processor includes a plurality of processor elements in which a processor element is specified as a master processor element by use of an identification signal so as to output a synchronization signal and the other processor elements accordingly assigned as slave processor elements receive the synchronization signal such that all the processor elements start processing in a synchronized fashion. As a result, a concurrent processing is enabled and a high-speed processing can be achieved.

Furthermore, the processor elements each having the same structure is implemented in an LSI and each processor element is assigned with an identification terminal. As a consequence, when an identification signal is received by a processor element, a plane to be supervised by the processor element is specified so that the processor element executes its own processing different from the processing of other processor elements. Consequently, for the development and increase in the precision of the display function, it is only necessary to increase the number of the processor elements and to add the pertinent identification signals.

Moreover, a rendering processor capable of effecting a concurrent processing including a plurality of processor elements is disposed in a display control section in a device such as a work station. When an instruction is inputted from input means such as a keyboard, the instruction is processed at a high speed by the rendering processor in the display control section so as to display an image on a display screen in a short period of time. As a result, there is provided a screen display apparatus having a satisfactory operability.

Furthermore, in order to attain luminance information of gradation pixels as gradation information with different gradation values on a display screen, there are provided in the apparatus an arithmetic processor for computing the luminance information through a linear interpolation and an arithmetic unit such as a multiplier for computing gradation information on the display for each pixel according to the computation result.

On receiving a difference value for each computation as compared with the initial luminance value, the arithmetic processor effecting the linear interpolation sequentially computes the pertinent luminance value. The multiplier effects a multiplication of the attained luminance value for effecting a multiplication of the attained luminance value for each pixel of an image, which as a result leads to gradation information to be displayed on the display. Gradation information thus obtained also includes the necessary pixels and hence only by writing the necessary pixels, an objective image can be attained.

BRIEF DESCRIPTION OF THE DRAWINGS

The present invention will be apparent from the following detailed description taken in conjunction with the accompanying drawings in which:

FIG. 16 is a diagram showing data specifying pixels;

FIG. 17 is a diagram illustrating specifications of colors and depths for a rendering processor;

DESCRIPTION OF THE PREFERRED EMBODIMENTS

Figure 1:
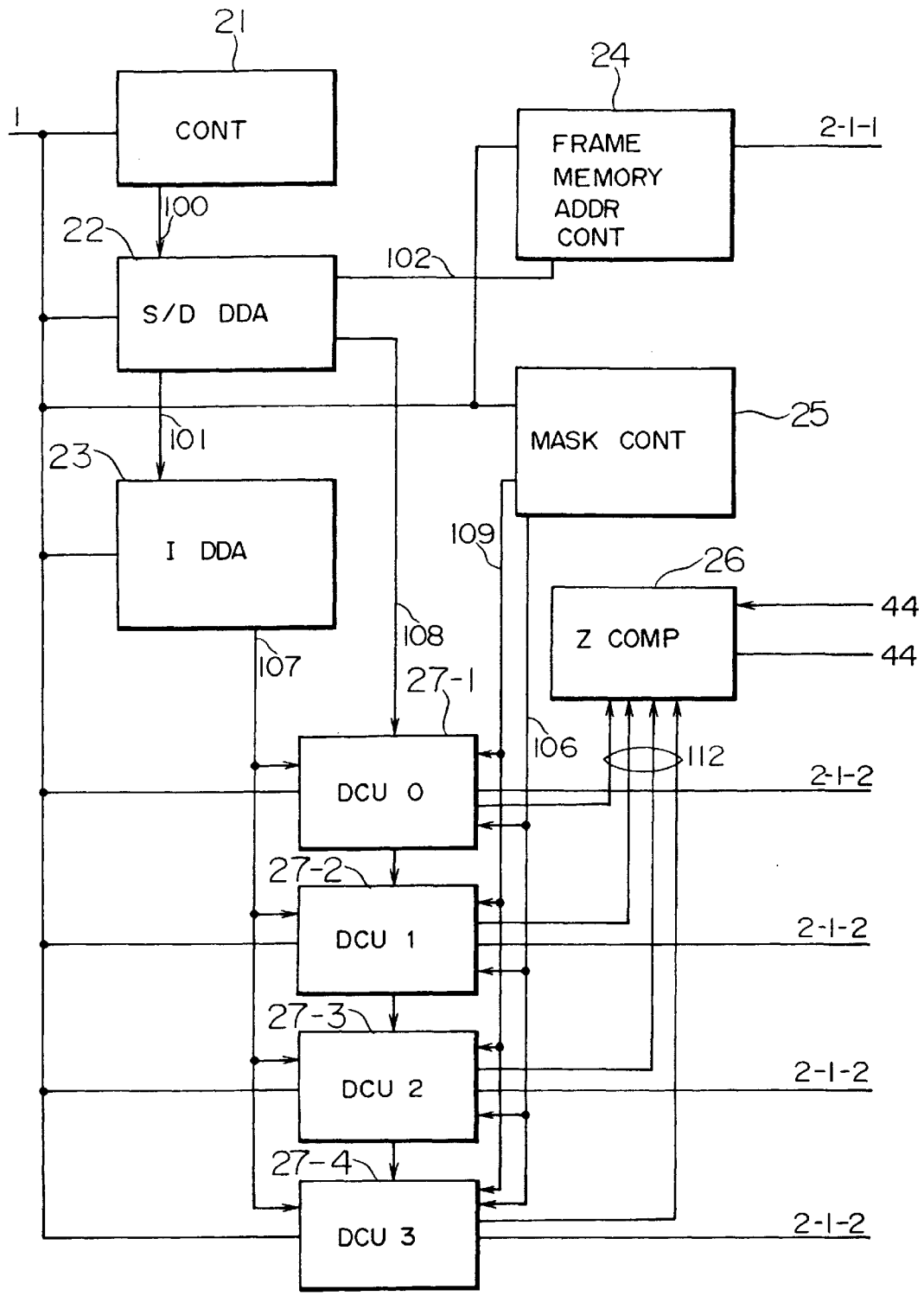
FIG. 1 is a schematic diagram showing the configuration a rendering processor according to the present invention.

Referring now to the drawings, description will be given of an embodiment according to the present invention.

Prior to a description of the hardware configuration as a central portion of the present invention, the position of the present invention in the overall system will be described.

Figure 3:
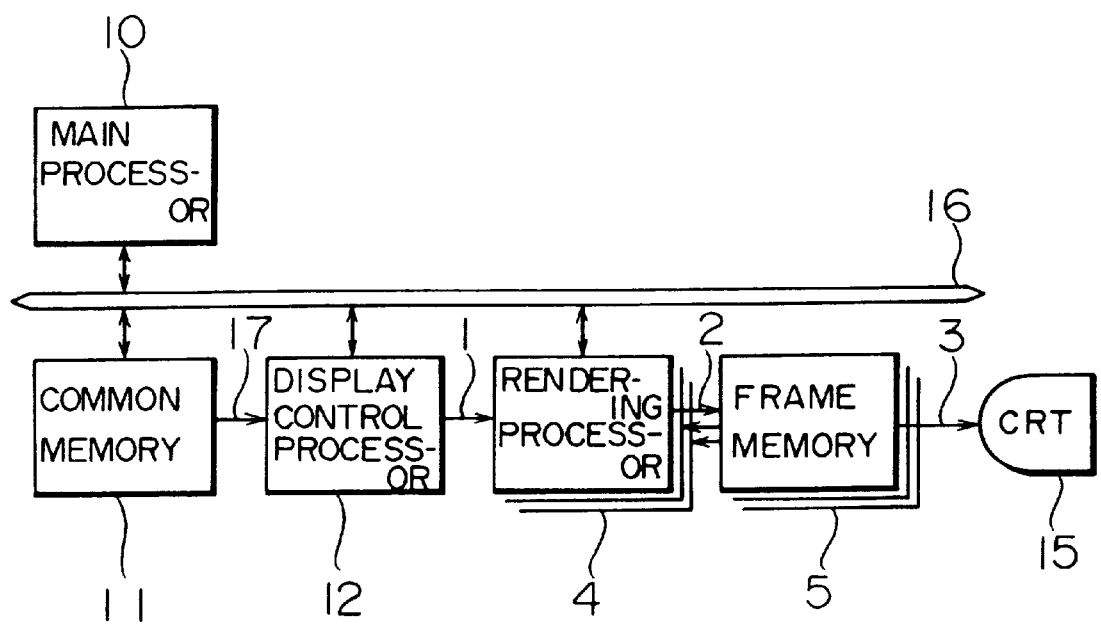
FIG. 3 is a schematic configuration diagram of the entire system of an embodiment according to the present invention.

FIG. 3 is a schematic diagram showing the entire configuration of an display system employing the present invention. In this configuration, centered on a bus 16, there are connected a main processor 10, a common memory 11 as communication means between the main processor 10 and the hardware associated with the display operation, a display control processor 12, rendering processors 4 for effecting a pixel expansion, frame memories 5, and a CRT as shown in FIG. 3.

When the main processor 10 displays a picture on the CRT, the operation is accomplished according to the following operation flow.

First, the main processor 10 writes a command associated with the picture to be displayed in the common memory 11 and thereafter initiates the display control processor 12 via the bus 16.

The display control processor 12 reads a command from the common memory 11 and interprets the command so as to thereafter disassemble the command into detailed commands, which are then sent to the rendering processor 4. The rendering processor 4 decomposes data in the pixel unit and effects a write control of the data in the frame memory 5. Since the contents of the frame memory 5 are continuously displayed on the CRT 15, the contents of the data thus written are instantaneosuly displayed on the CRT 15.

Since the gist of the present invention resides in the rendering processor 4 which expands the pixels, description will be given of the detailed configuration thereof in the following paragraphs.

Figure 2:
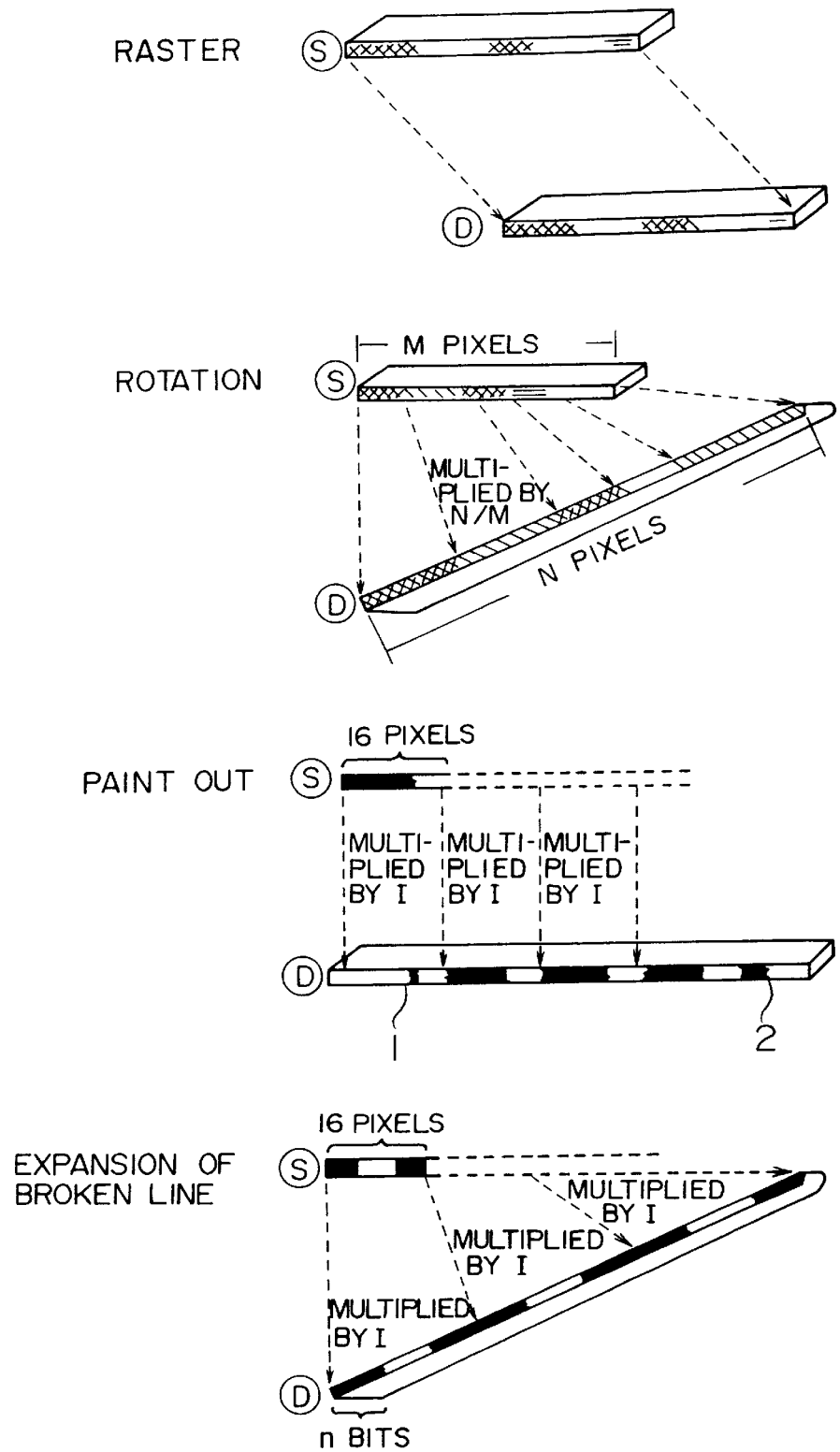
FIG. 2 is a diagram schematically illustrating rendering processor functions according to the present invention.

FIG. 2 shows primary functions of the rendering processor 4 in which Ⓢ indicates a source image and Ⓓ designates a destination image.

An image having a depth is represented as an image having a width in the diagram.

First, the raster operation is effected in the same direction for the source and destination images and the size thereof is also equal to each other; consequently, a plurality of pixels can be processed at a time.

The rotation is achieved in the horizontal direction for the source image, whereas for the destination image, there appears an inclination and the number of pixels are multiplied by N/M as shown in FIG. 2.

In the paint-out operation, based on frame information written in the destination image, pattern information of the source multiplied by I is written in the range from ① to ②.

Although the development of a broken line is similar to the paint-out operation, there exists a difference that the destination image is inclined.

Each rendering processor can achieve the processing above for the pixel comprising four bits. Particularly, the following operations can be executed.

1) In the raster operation, 16 pixels can be read and written at a time.
2) In the rotation, 16 pixels are read at a time for the source image, whereas for the destination image, computations are effected to attain successive pixels the maximum number of which is 16 in the horizontal direction so as to finally write the data.
3) In the paint-out operation, paint-out data for 16 pixels is generated so as to be written in the frame memory 5.
4) In the expansion of a broken line, like in the rotation of 2) above, for the destination image, computation are effected to attain successive pixels the maximum number of which is 16 in the horizontal direction so as to finally write the data.

Next, a description will be given of the configuration of each rendering processor.

Figure 4:
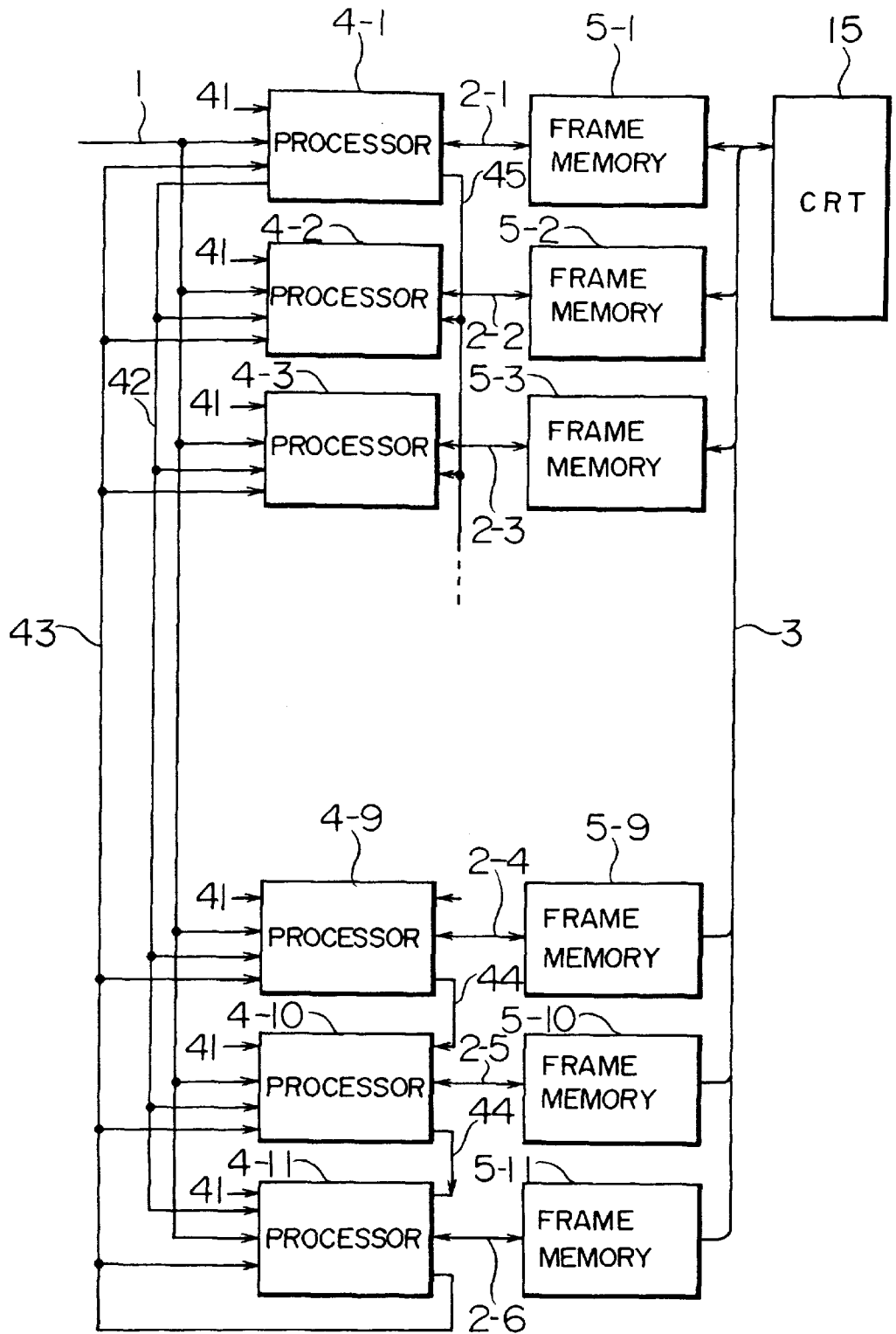
FIG. 4 is a schematic diagram showing the connection relationships of a rendering processor.

The rendering processor 4 comprises a group of processors arranged in parallel as shown in FIG. 4, each processor being capable of processing in units of a pixel including four bits.

Each processor is connected via the bus 2 to the frame memory 5, and all processors are connected to the display control processor 12 only via the bus 1.

The rendering processor 4 is decomposed into the same processors 4-i (i=1, . . . , 11) which are assigned with the respective functions as follows.

Work plane control (for the paint-out operation): 4-1

Red plane control: 4-2, 4-3

Green plane control: 4-4, 4-5

Blue plane control: 4-6, 4-7

Z plane control: 4-8 to 4-11

Each rendering processor is provided with a signal 41 indicating a correspondence to a plane and a signal 42 enabling a synchronization for a data set or read operation via the bus 1 to the processor. The system is configured such that the signal 42 is outputted from a control section of a master processor.

Referring now to FIG. 1, a description will be given of the internal configuration of the rendering processor.

The processor includes a control section 21, a DDA compute section (a DDA 22 associated with a source/destination address and a DDA 23 for computing the gradation and Z value) for computing an address and gradation information of each pixel, a data control section 27 for computing data of 16 pixels of a raster in the frame memory (since four memory planes are to be controlled by a processor, four data control units DUC0–DUC3 are arranged in a parallel fashion), a Z comparator 26 for effecting a comparison of the Z value, a mask control section 25 for generating a mask to select pixels to be written, and a frame memory address control section 24 for generating an address of the frame memory in the 16-pixel unit.

The rendering processor effects operations as follows.

A command and data from the display control processor 12 are set via the bus 1 into registers in each rendering processor 4. Since the rendering processor 4 includes registers in a two-stage configuration for the pipeline control, even when the rendering processor 4 is in operation, the next command and data can be set therein.

The display control processor 12 first sets the necessary data into a register and then loads a command in the command register.

For example, in a case where a direct line having a constant color is expanded, the data listed below is set and then a line expand command is loaded.

(1) Coordinate values (Xs, Ys) of a start point of the line expansion are set into registers in the address DDA.

(2) Increment values (DX, DY) of the coordinate values (Xs, Ys) are also set into registers in the address DDA.

(3) The number n of dots for the line expansion is set into a register in the control section 21.

(4) Color information I of the line is set into a register in the gradation DDA 23.

After the data above are set, when a line expansion command is received, the rendering processor effects the operations as follows.

(1) Of the coordinate values (Xs, Ys), the four low-order bits (corresponding to an address in the 16 pixels of a raster) of Xs are decoded to cause the mask control section to turn the corresponding mask bits off, and color information I of the corresponding pixel is set into a register in the data control section.

(2) The following computations are accomplished.

$$Xs = Xs + DX$$

$$Ys = Ys + DY$$

In a case where Xs exceeds the boundary of the 16 pixels of a raster or where the value of the integer component of, Ys is changed, based on the pixel information and the mask information generated in the step (1), the data is written in the raster in the unit of 16 pixels in the frame memory. In other cases, the processing of (1) is achieved by use of new coordinate values (Xs, Ys). Furthermore, the number of dots for the line expansion is decremented by one. If the result is 0, the processing is terminated. Through the control operations above, data including a maximum of 16 pixels is generated in a register of the data control section so as to be written in the frame memory.

Since the frame memory address is identical in the 16 pixels, the value attained by removing the four low-order bits of Xs of the coordinates (Xs, Ys) is sent to the frame memory address control section 24 and is further delivered via a bus 2-1-1 to the frame memory.

In a case where the gradation is altered in a line expansion, since the display control processor further sets the change DI of the color information, the computation of $$I = I + DI$$

is effected in addition to the computation of the coordinates (Xs, Ys).

Furthermore, in a case of a rendering processor which controls the Z plane, the value of I is used as the Z value; consequently, the value is compared with the Z value of the frame memory previously read out by use of the Z comparator 26. If the Z value on the frame memory side is greater, the mask control section 25 achieves a control to turn the corresponding pixels on in the mask.

The outline of the operations of the rendering processor has been described. Next, a detailed description will be given of the operation of each block.

Figure 5:
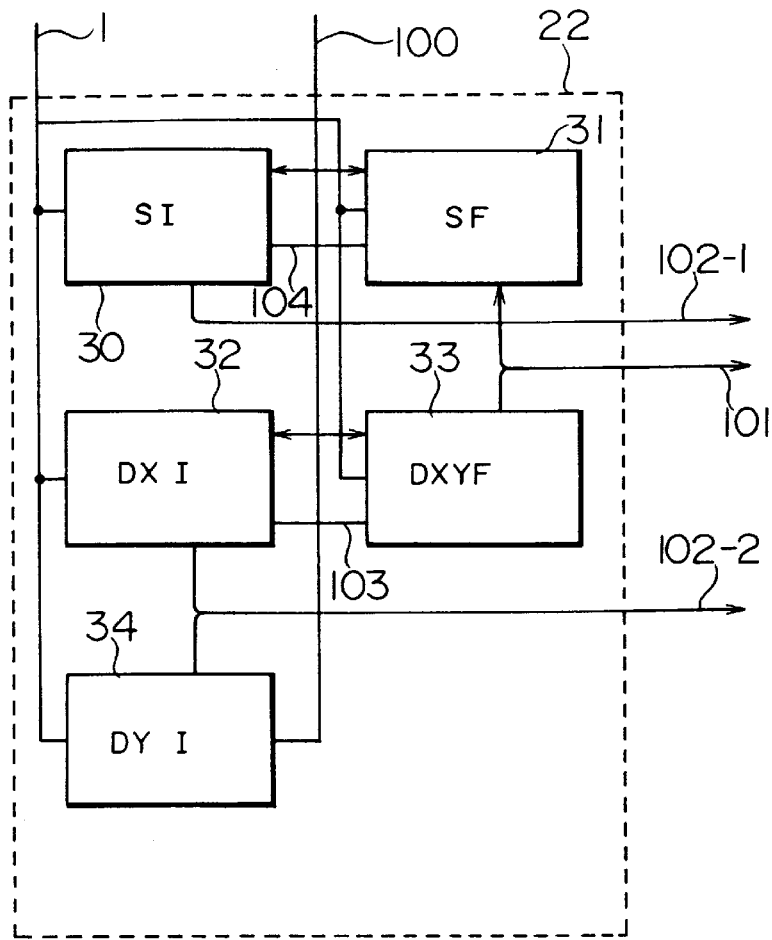
FIG. 5 is a diagram showing the configuration of an address DDA.

FIG. 5 shows the internal constitution of the address DDA 22.

For the destination coordinates (X, Y), according to the well known Bresenham's DDA algorithm, the coordinates are obtained by using the longer one of the X and Y axes as the reference. Namely, the computation is sequentially accomplished by a DXYF section 33 for computing the carry over in the fractional part and a DXI section 32 and a DYI section 34 for computing the integer part based on a signal 103 associated with the carry over. In the DXI and DYI sections associated with the long axis, the respective content is incremented by one in any operation.

On the other hand, for the source coordinates (X, Y), since the source image moves only in the raster direction, there are provided arithmetic units 30–31 only associated with the X coordinate value. Since the long axis of the destination side is set as the reference, there are included an SI section 30 for computing an integer part and an SF section 31 for computing a fractional part such that the computation is controlled according to a carry propagate signal 104 to pass the carry from the fractional part to the integer part.

The algorithm employed for the DDA is generally expressed as follows with reference to the length of the long axis SL BASE.

$$A = A_0$$
$$B = B_0$$
$$SL\_INT = (B_1 - B_0) \text{ DIV } SL\_BASE$$
$$SL\_MOD = (B_1 - B_0) \text{ MOD } SL\_BASE$$
$$IN\_ERR = 0$$
$$IN\_ERR = IN\_ERR + 2 * SL\_MOD - SL\_BASE$$
$$N = SL\_BASE$$
$$\text{WHILE } N = 0$$
$$\text{DO BEGIN}$$
$$A = A + 1$$
$$IN\_ERR = IN\_ERR + 2 * SL\_MOD - 2 * SL\_BASE$$
$$B + B + SL\_INT + \text{carry-from-} IN\_ERR$$
$$N = N - 1$$
$$\text{END};$$

Figure 7:
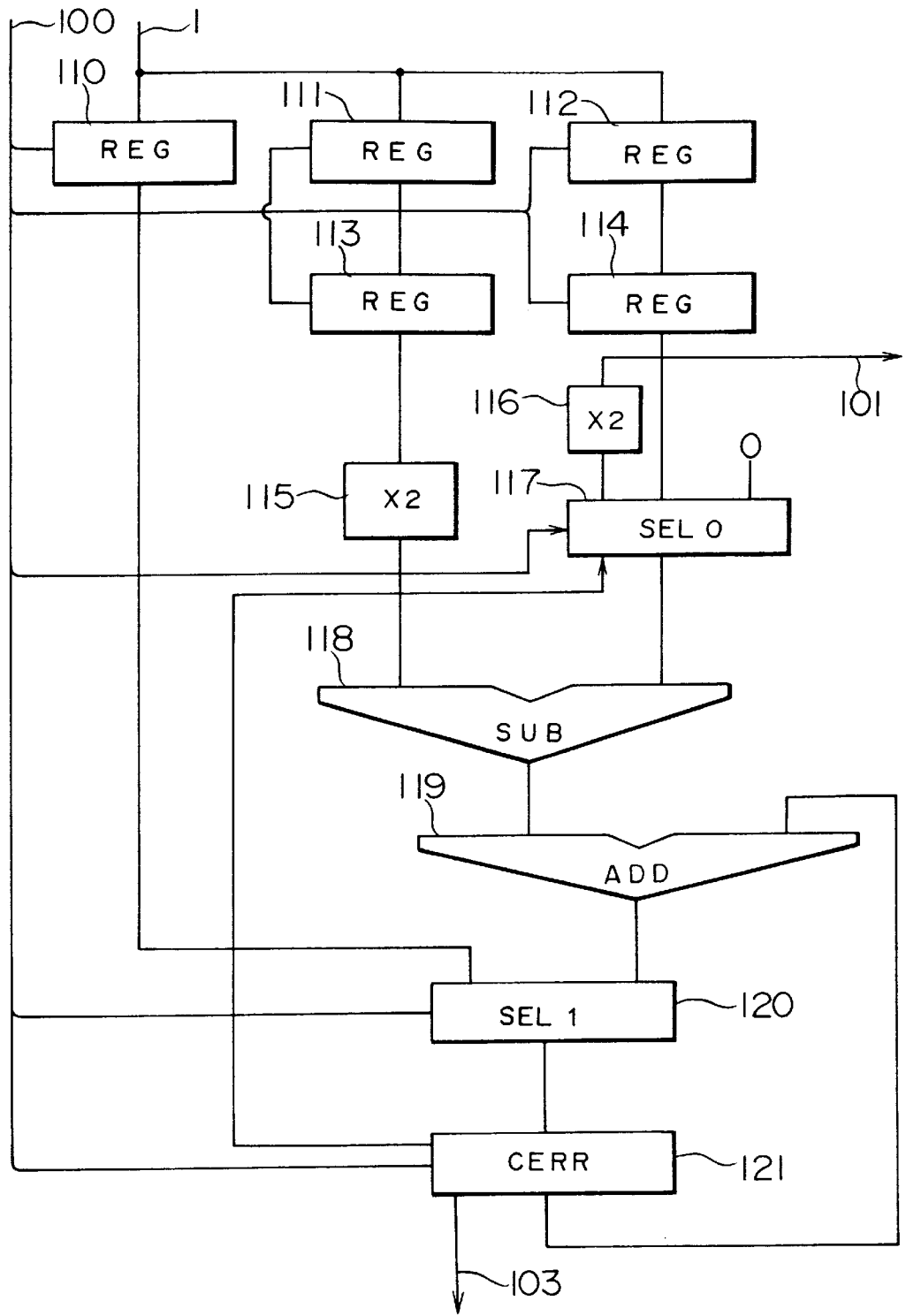
FIG. 7 is a diagram illustrating the configuration of a DDA for a fraction part.
Figure 8:
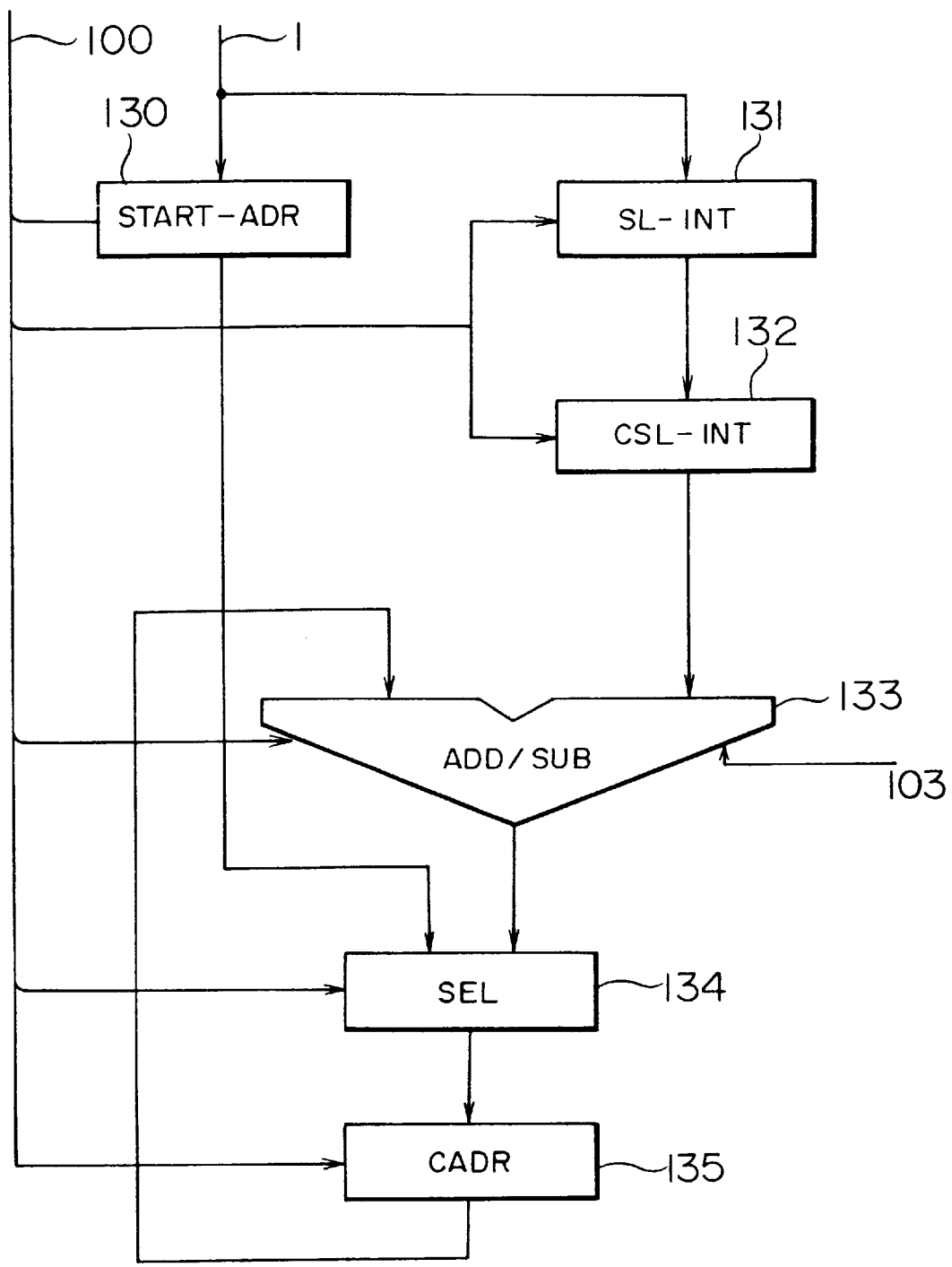
FIG. 8 is a diagram illustrating the configuration of a DDA for an integer part.

The operation above is common to all coordinate values excepting that the adding value SL_INT is missing for the destination (X, Y) coordinates, namely, the DDA circuits for the fractional and integer parts are configured as shown in FIGS. 7–8.

First, the operation of the fractional part will be described. As initial values, the length of long axis SL BASE, other axis modulo part SL_MOD, and error term IN_ERR are supplied from the display control processor 12 via the bus 1. Since the registers 112, 111, and 110 respectively corresponding to the items above are dedicatedly assigned independently of the registers 114, 113, and 121 to be used during the operation, the values can be set to the registers even when the preceding command is being executed. The respective set signals are supplied as a control signal 100 from the control section 21.

The value of IN_ERR is 0 in the expression of the DDA circuit; however, when a direct line is interrupted by a clipping control, the lattice point of the line is not used as the start point. In such a case, since there appears a difference, this register is loaded with a correction value to be used.

After the DDA computation in the current execution is terminated and the display control processor 12 sets a command to the command register, the control section 21 outputs a signal via the bus 100 so as to move the contents of the initial value registers 110–112 to the current registers 121, 113, and 114.

Thereafter, an initial value is set to the CERR 121, and on receiving a carry signal 103 from the CERR register 121, the control section 21 continues processing by use of the bus 100.

On the other hand, for the integer part, the integer portions of the start point coordinates and the bias value for the next point are set to the START_ADR register 130 and the SL_INT register 131, and an initiation is effected so as to load the contents of the registers 130–131 in the current register CADR 135 and CSL_INT 132. Thereafter, in synchronism with the operation of the fraction part, the computation is effected in response to the carry signal 103 as follows.

$$CAER=CADR\pm CSL\_INT+CIN$$

The addition or subtraction is accomplished depending on the signal indicating the incremental or decremental direction, respectively.

For the destination coordinates (X, Y), since the long axis is employed as the reference in any case, the CSL INT is 0; however, the fundamental operation is the same.

The operation of the address DDA circuit 22 has been described in detail.

Figure 6:
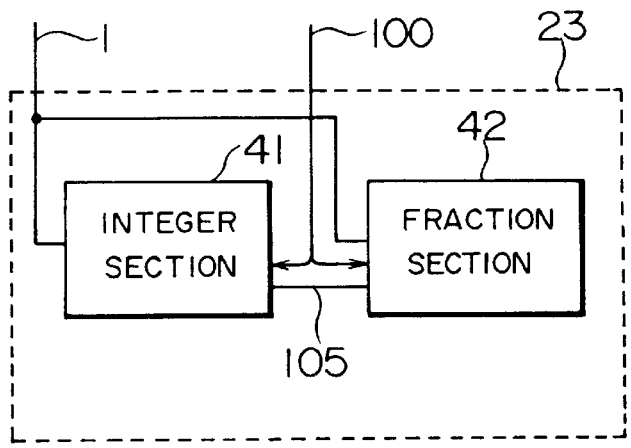
FIG. 6 is a diagram illustrating the configuration of a gradation DDA.

The operation of the gradation DDA 23 is basically identical to that of the address DDA 22. As shown in FIG. 6, the gradation DDA 23 includes an integer section 41 and a fraction section 42 such that the computation of the gradation value or the Z value is achieved in the same hardware as that of the address DDA 22.

Figure 9:
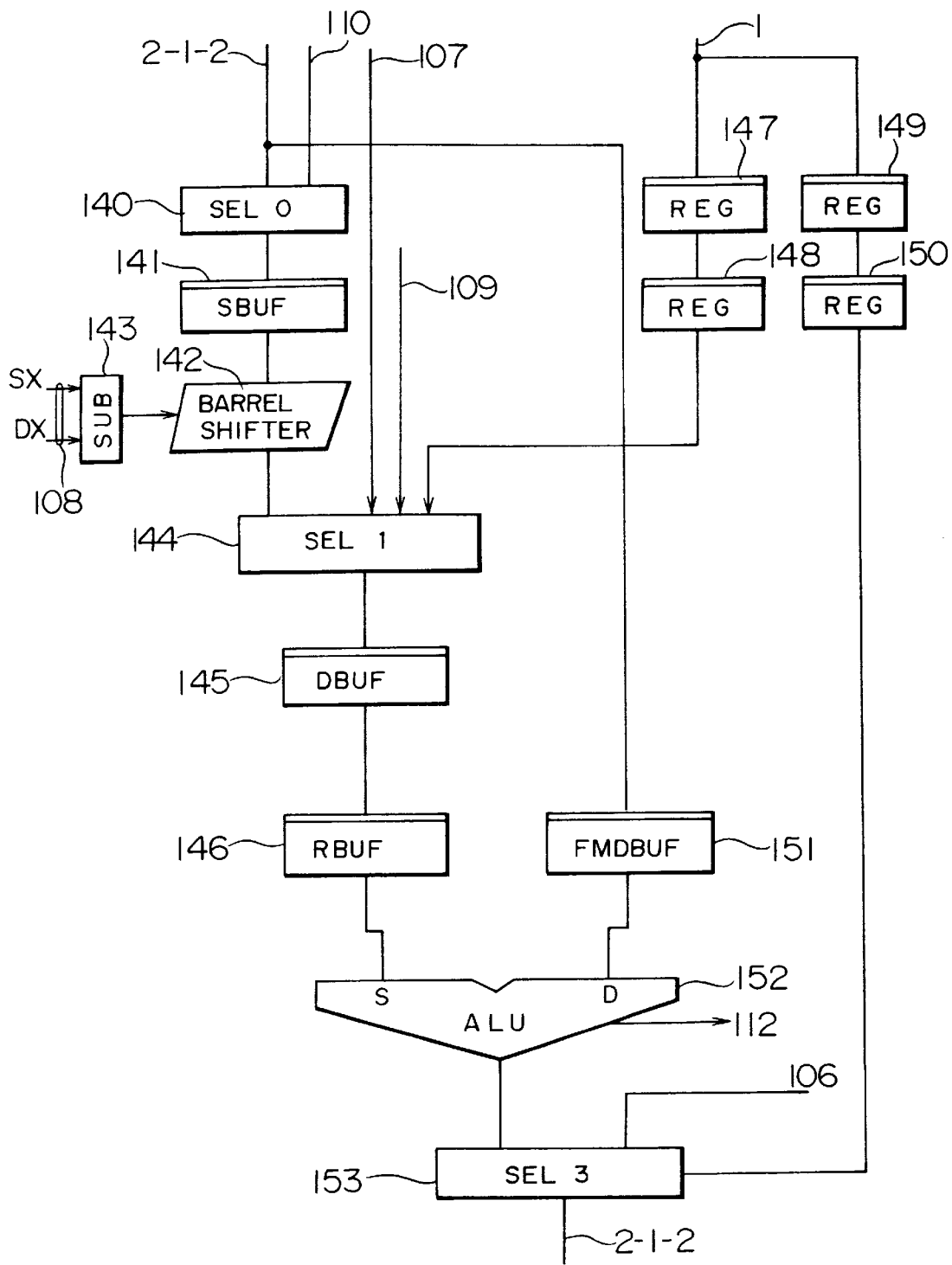
FIG. 9 is a diagram showing the configuration of a data control section.

Next, a description will be given of the configuration of the data control section 27. In order to control four planes, a processor includes four data control sections 27-1 to 27-4; however, since each data control section basically has the same configuration, one of the data control sections will be described with reference to FIG. 9.

In a case where a source image from a frame memory is necessary, for example, in an affine transformation of an image, a read operation is effected via a bus 2-1-2 on the frame memory such that data associated with 16 pixels is set into an SBUF register 141. The bus 1 is used when data is supplied from the display control processor 12. In this case, data associated with a pixel is loaded in the SBUF register 141.

The data thus set is shifted in the barrel shifter 142 by a value attained by effecting a subtraction in a subtractor 143 between the four low-order bits of the source X coordinate generated by the address DDA and the four low-order bits of the destination X coordinate. This processing is effected so that the position of the source image in the unit of 16 pixels is aligned with that of the destination image in the 16-pixel unit so as to locate the data in the identical 16-bit bus.

The result of the shift operation is set via a selector 144 to a DBUF register 145. For the set signal of the DBUF register, there are effected the following controls.

(1) When data is generated in a pixel-by-pixel fashion, only for the bit attained by decoding the four low-order bits of the destination X coordinate, the set signal is outputted to the flip-flop.

(2) In a case like the raster operation where n pixels are generated at a time, the set signal is outputted to all flip-flops on the left of or on the right of the bit obtained by decoding the four low-order bits of the X coordinate. The left or right side is determined depending on the relative positional relationships between the source image and the destination image.

That is, when the source image is on the left of the destination image, the data is sequentially processed from right to left so as not to destroy the picture due to the overlapping therebetween and hence the flip-flops on the right side are set; in another case, the flip-flops on the left side are set.

The operation to generate an image in the pixel-by-pixel fashion is effected as follows.

a) The same SBUF content is used until a carry occurs from the four low-order bits of SX to the higher position.

b) Pixels are written in the same DBUF until a carry occurs from the four low-order bits of DX to the higher position or the content of DY is altered.

Through accomplishing of the controls above by the control section 21 in response to the signal from the address DDA circuit, the processing can be executed with a minimum of accesses to the frame memory, which leads to a high-speed processing.

The image data generated in the DBUF is set into the RBUF register 146 under the condition of b) above. The destination image at this moment is read into the FMDBUF register 151, a computation is achieved by the ALU 152, the data is selected by the selector 153 by use of the mask data 106 generated by the mask control section, and the resultant data is attained as write data 2-1-2 to the frame memory. The data selection by use of the mask data is effected because the recent dual port memory is so configured as to receive the mask data and the ordinary data in the time sharing fashion.

On the other hand, for the register 147 storing a background color and a register 149 controlling a mask for each plane, there is provided a bit for each, namely, the contents of the registers 147 and 149 are used as control signals of selectors SELL 144 and SEL3 153, respectively, so that during line expansion or the like, the content of the register 147 is set into the DBUF 145 as data corresponding to 0 and the content of the register 149 masks all bits to be written in the pertinent plane regardless of the data outputted from the ALU 152.

On the other hand, the gradation information 107 sent from the gradation DDA effects a control such that the DBUF 145 is loaded with the data corresponding to 1 during the line expansion or the like.

The operation of the data control section 27 has been described. The operation to generate image data to be supplied to the DBUF and the operation to access frame memories subsequent to the RBUF 146 are executed in a pipeline processing; consequently, the processing to set the next image information, during a frame memory access, to the DBUF register can be repeatedly effected up to 16 pixels constituting a raster, which increases the processing speed.

Figure 10:
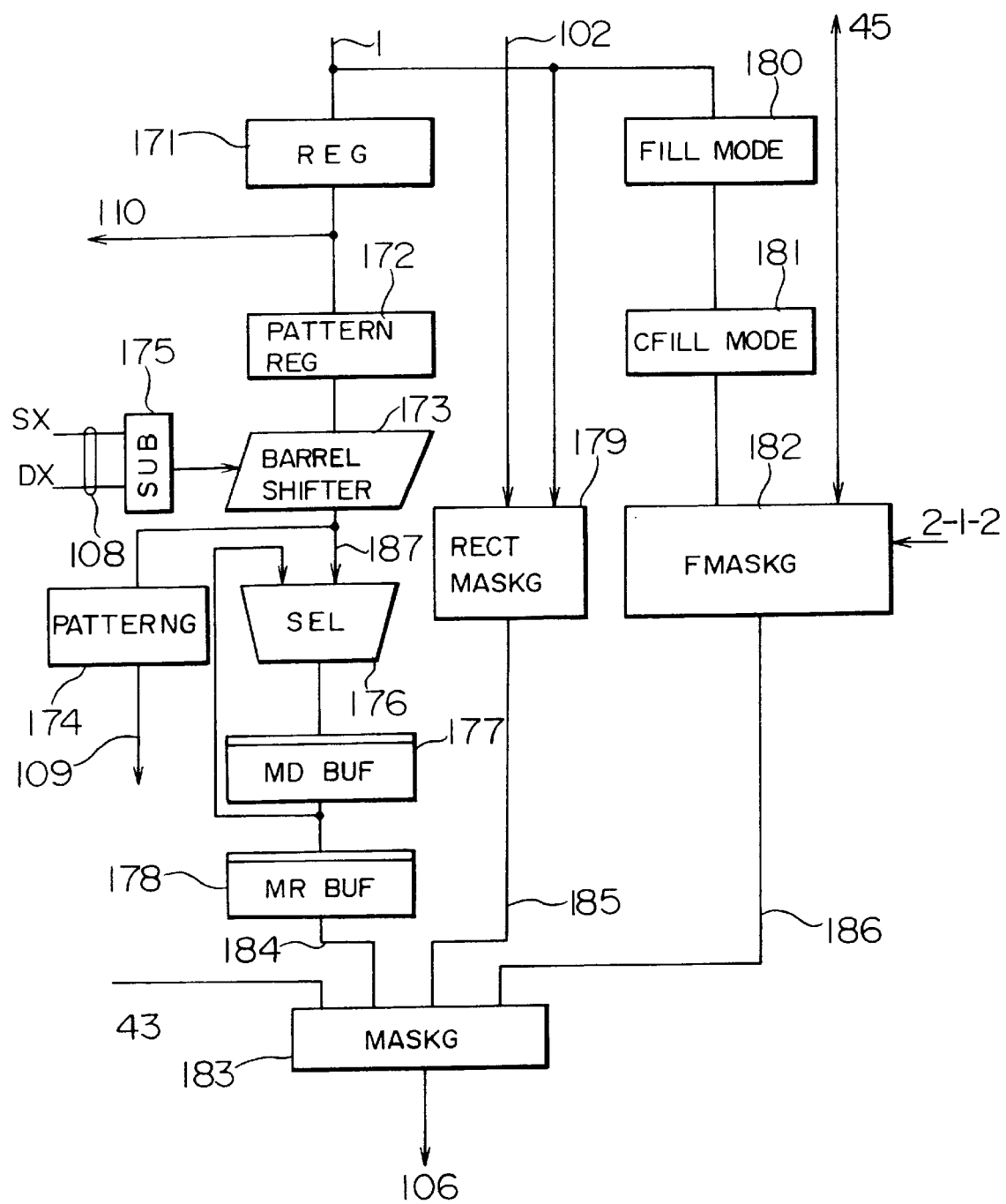
FIG. 10 is a diagram showing the configuration of a mask control section.

Referring now to FIG. 10, a description will be given of the operation of the mask control section 25.

For the generation of the mask data, the following conditions are required to be taken into consideration.

1) When the Z value of the frame memory is found to be greater depending on the result from the Z comparator, the write operation is to be inhibited; consequently, it is necessary to generate mask data. For this purpose, a signal, Z compare mask 43 is provided.

2) For the positions corresponding to a pattern 0 in the line expansion of a broken line or in a paint-out operation of hatching data, the write operation is required to be inhibited. A signal, pattern mask 184 is provided for this purpose.

3) In the raster operation or the like, the write operation must be inhibited up to the start point or after the end point. A rectangular mask 185 is employed as a signal therefor.

4) In the paint-out operation, for the data written in the paint-out work area, the paint-out operation must not be effected in a range from an even-numbered 1 to an odd-numbered 1, namely, the write operation is required to be inhibited in this range. For this purpose, a mask signal 186 is provided.

The mask signals respectively generated in the four cases above are combined in the MASKG 183 so as to generate an overall mask signal 106.

Next, a description will be given of the methods of generating the respective mask signals.

1) Z mask signal

For the Z mask signal, the carry signal attained by the compare operations with the frame memory in the Z plane control processors 4-8 to 4-11 of the rendering processor, respectively (i.e. the signal 44 is passed through the respective components so as to obtain the final compare result as a signal 43) is supplied as a Z mask input signal to the respective rendering processor, thereby generating a mask signal. The method of generating the carry signal will be described later when the content of ZCOMP 26 is explained.

2) Pattern mask signal

Pattern information supplied via the bus 1 is temporarily set to the register 171. The registers 171–172 constitute a two-stage configuration to effect a pipeline control, namely, the content loaded in the register 171 is set to the register 172 at the execution time.

The method of setting the content of the register 172 to the register 177 is similar to the method of generating the source image described in conjunction with the configuration of the data control section 27 and is accomplished through the operations as follows.

First, the subtractor 175 effects a subtraction between the four low-order bits respectively of the X coordinate values of the source and destination images generated by the address DDA section so as to attain a difference therebetween. Based on the subtraction result, the barrel shifter 173 is controlled such that the content of the pattern register is shifted by a plurality of bits and the resultant data is delivered to the bus 187.

For the valid bit positions of the bus 187, the selector 176 outputs only the signals on the bus 187 side; for the other bit positions, the output to the MDBUF register 177 is selected. As a result, the MDBUF 177 is loaded only with the effective pixel mask data selected from the shift result supplied from the barrel shifter 173.

Through repetitious operations of the processing above, mask data associated with 16 pixels of a raster is generated in the DMBUF register 177.

The mask data thus generated is set to the MRBUF register 178 at a timing identical to the timing when the data of the DBUF register 145 is set to the RBUF register 146 in the data control section 27.

Through the operations above, there is generated the pattern mask data 184 corresponding to an access of the frame memory.

3) Rectangular mask signal

The rectangular mask signal of the raster operation must be generated under the following conditions.

i) The operations must be controlled with a mask such that when the raster operation is started, the write operation is not effected at the pixel positions on the left or right of the four low-order bits of the destination address. The left or the right positions are determined depending on the positional relationships between the source image and the destination image.

ii) The operations must be controlled with a mask such that when the raster operation is terminated, the write operation is not effected at the pixel positions on the left or right of the position corresponding to the value obtained by adding or subtracting the number of the remaining pixel to or from the four low-order bits of the destination address. The addition or subtraction as well as the left or the right positions are determined depending on the positional relationships between the source image and the destination image.

iii) In a case where there exists a small number of pixels in the raster operation, the conditions i)–ii) take place at the same time; consequently, the mask data generated under the conditions i)–ii) are to be ORed so as to generate the rectangular mask data.

The control described above is accomplished by the rectangular mask generate section 179 depending on the four low-order bits 102 of the destination address and the signal 1 from the control section.

4) Paint-out mask signal

The paint-out mask signal is generated as follows by the rendering processor controlling the work plane.

Information 2-1-2 of the plane in which the paint-out frame is drawn is first read to search for a position containing bit of 1 such that depending on the content of the CFILL MODE register 181, data is masked beginning from the pixel on the left side up to the position where 1 is found; or, the data is generated not to effect the masking operation. These operations are repeatedly achieved to obtain mask data associated with 16 pixels and the resultant data is sent to the bus 45.

On the other hand, the rendering processors of other planes uses the bus 45 to receive an input signal such that the mask signal 45 is directly delivered to the bus 186.

As a result of the operations above, the paint-out mask signal is generated.

Figure 11:
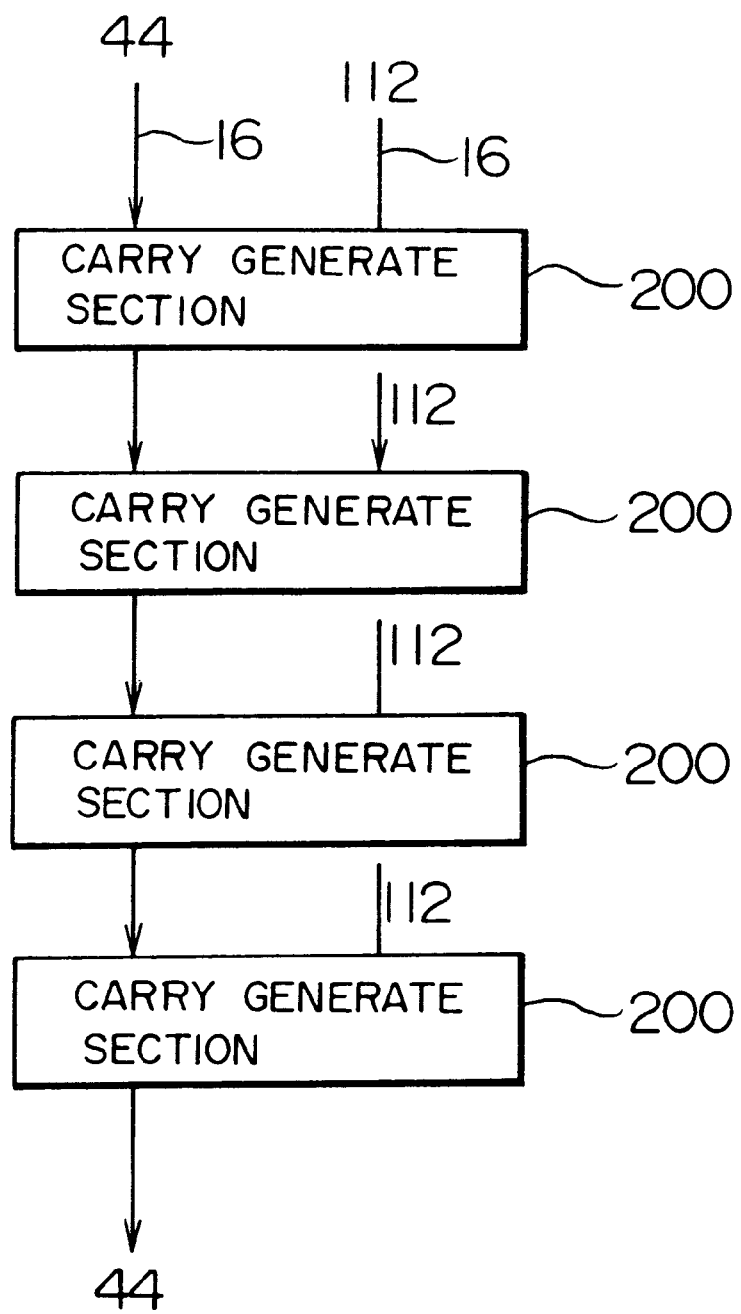
FIG. 11 is a diagram showing the configuration of a Z comparator.

Referring next to FIG. 11, a description will be given of the content of the Z comparator 26.

Based on the carry propagate signal 112 outputted from the ALU 152 of the data control section 27 and the carry input signal 44 from other rendering processor, the carry signal is generated for each plane, thereby generating and outputting a carry signal associated with the four planes of a processor. For this purpose, four carry generate sections 200 are connected in a serial fashion. Incidentally, since the internal configuration of the carry generate section is well known, detailed description thereof will be omitted here; however, since the comparison of 16 pixels is to be accomplished at a time, the input/output signals each include 16 bits.

Figure 12:
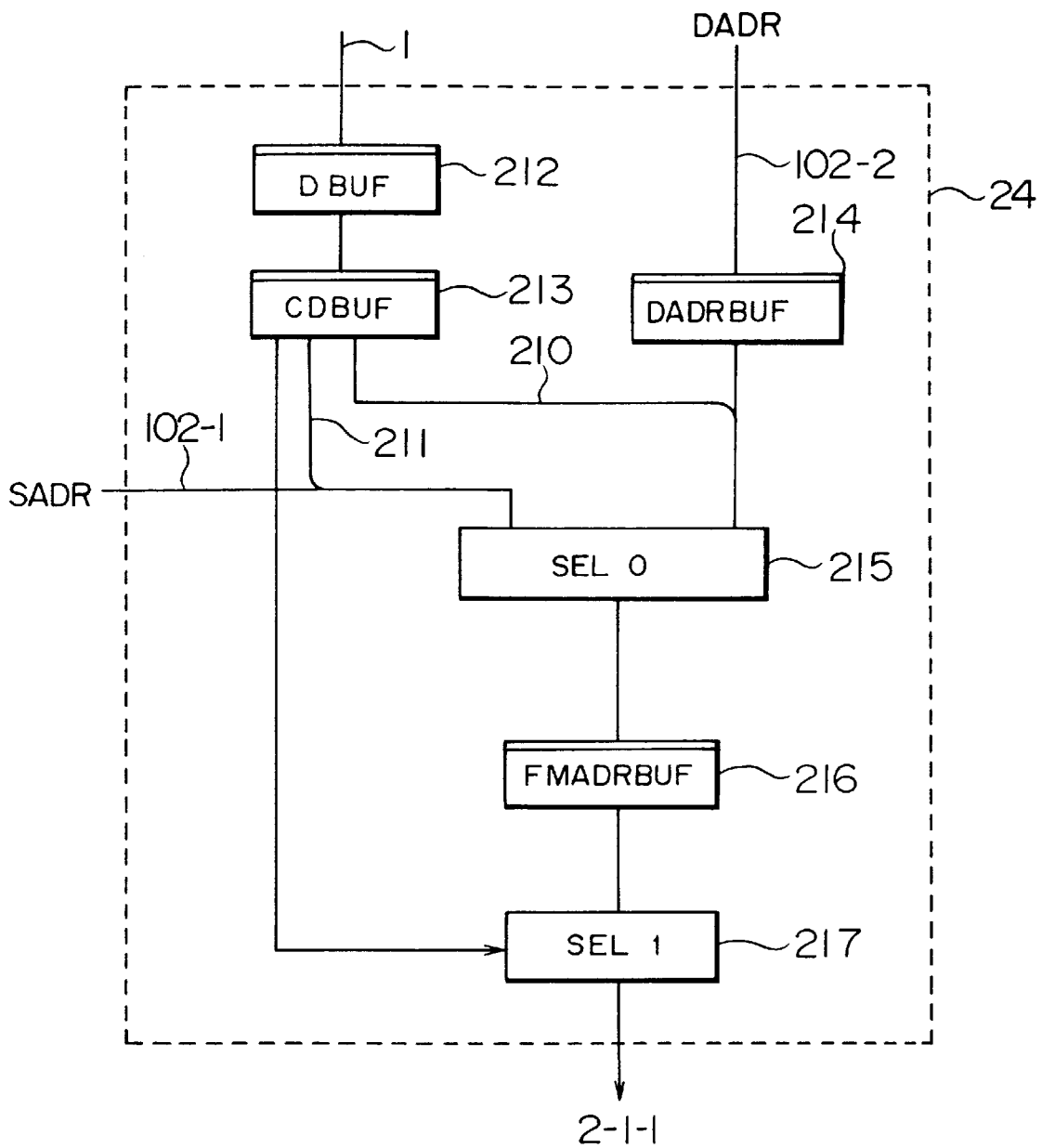
FIG. 12 is a diagram showing the configuration of a frame memory address control section.

Referring now to FIG. 12, a description will be given of the configuration of the frame memory address control section 24.

In order to specify a control mode such as the mode of the double buffer control, there is disposed a DBUF register 212.

In the execution state, like the registers described above, the content of the DBUF register 212 is copied onto the CDBUF register 213.

First, for an operation to read a source image, a source address indicated via the bus 102-2 is set via a selector 215 to an FMADRBUF register 216. During this operation, depending on a signal 211 from the register 13, it is possible to select one of the double buffers.

The address loaded in the register 216 is, in order to control the dynamic RAM, further multiplexed with respect to the row and column addresses through a selector 17 so as to be delivered via the bus 2-1-1 to the frame memory.

On the other hand, the destination address is, in order to effect the pipeline processing with the DDA circuit and the raster operation circuit, temporarily set to the DADRBUF register 214. The operations thereafter are identical to those of an access achieved by use of a source address.

The configuration and operation of the respective components of the rendering processor have been described. According to the embodiment, during a memory access, there can be generated plural dots for a maximum of 16 horizontal pixels.

According to the embodiment above, since the processing in which the DDA control circuit and the raster operation are combined can be executed at a high speed, the affine transformation such as a magnification, reduction, or the like and a smooth paint-out processing are executed at a timing of one pixel per one machine cycle (about several tens of nanoseconds), namely, a screen having about $10^3 \times 10^3$ pixels can be drawn in about 0.1 second.

Next, referring now to FIGS. 13–25, other embodiments will be described according to the present invention.

Figure 13:
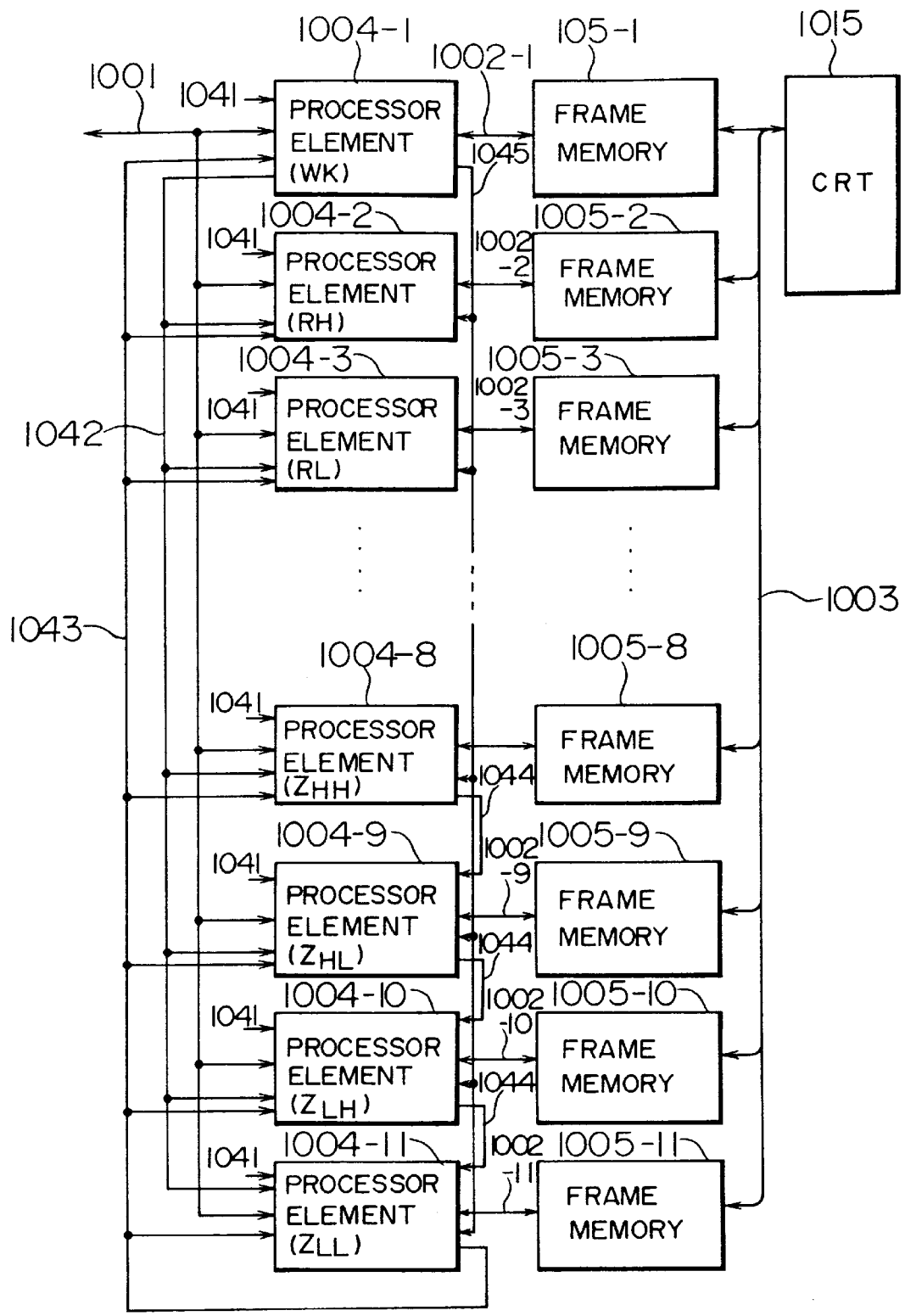
FIG. 13 is a diagram showing the configuration of a rendering processor section repeatedly utilizing the same hardware of a second embodiment according to the present invention.
Figure 14:
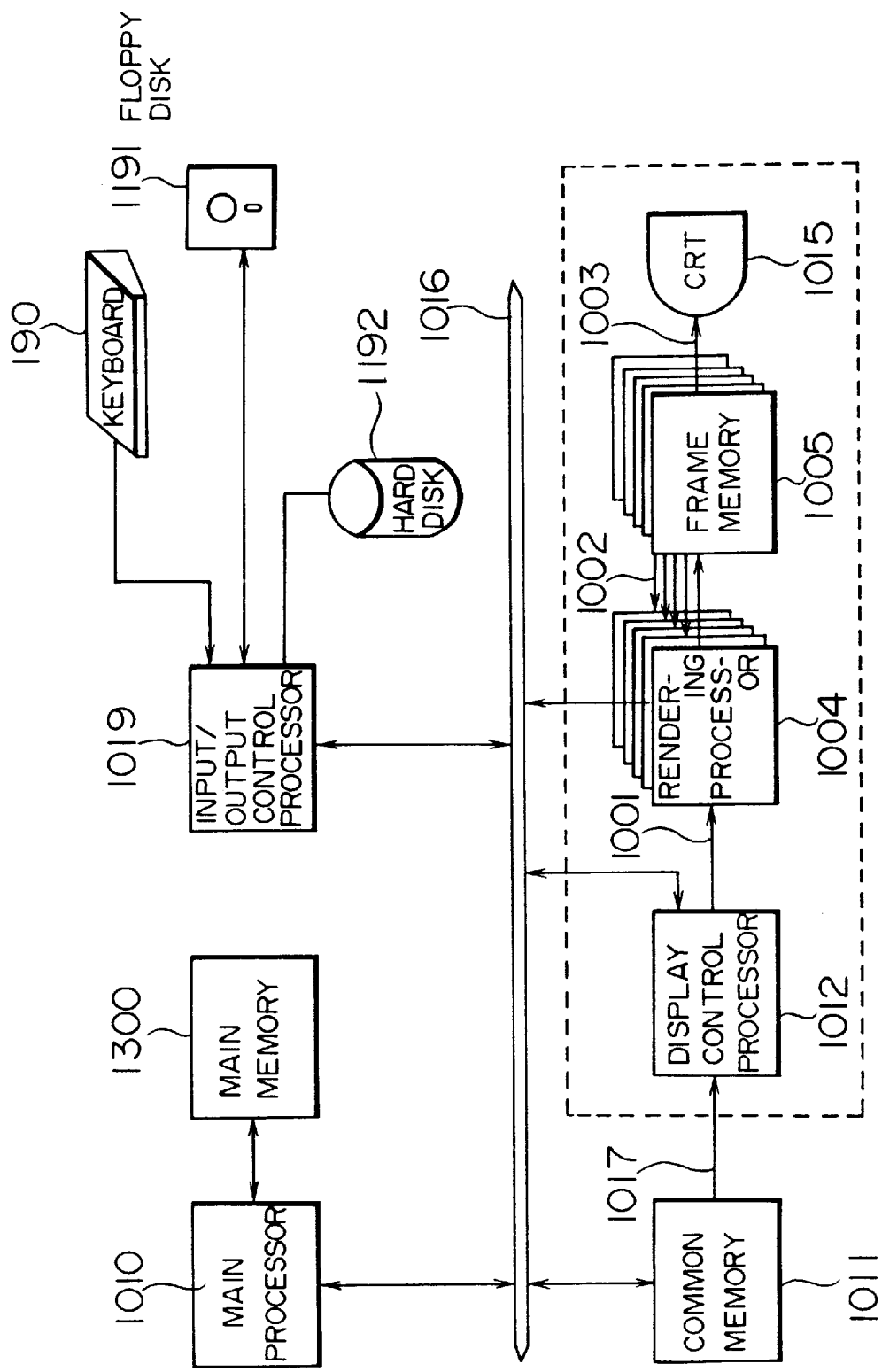
FIG. 14 is a diagram showing the overall system configuration of the second embodiment according to the present invention.
Figure 15:
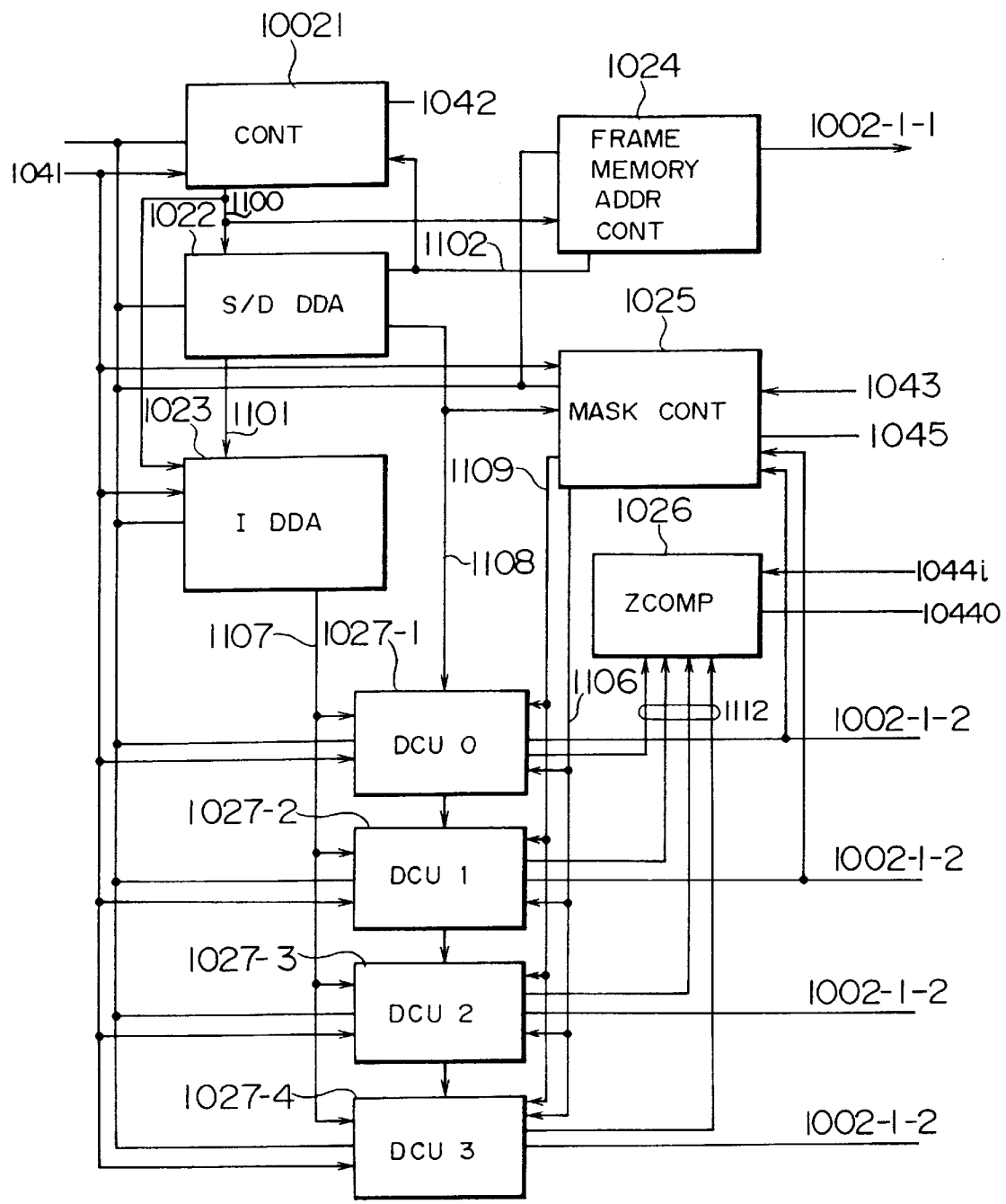
FIG. 15 is a configuration diagram of a rendering processor in the second embodiment according to the present invention.

FIG. 13 is a schematic diagram showing the configuration of the rendering processor section in which the same hardware as the central component of the present invention is repetitiously used, FIG. 14 is a diagram schematically showing the overall system configuration, FIG. 15 is a configuration diagram of the hardware, and FIGS. 16–25are explanatory diagram useful to explain in detail the configuration of each block of the system.

Prior to describing the hardware configuration as a central element of the present invention, the position of the present invention in the entire system will be described.

FIG. 14 shows the configuration of a work station to which the present invention is applied. In the configuration of FIG. 14, an input/output control processor 1019 effecting an input/output control other than the display control for a hard disk 1192, a floppy disk 1191, a main processor 1010, a main memory 1300 storing a program of the main processor 1010, a common memory 1011 as communication means for the main processor 1010 and the hardware associated with the display operation, a display control processor 1012, rendering processors 1014, frame memories 1005, and a CRT 1015 are connected by use of a bus 1116 as shown in this diagram.

Incidentally, in FIG. 14, the region enclosed with dotted lines indicates the display control section.

The operation flow in a case where the main processor 10 displays a picture on the CRT 15 is the same as that of the first embodiment, namely, the rendering processor effects the same function as that described with reference to the first embodiment of FIG. 2.

Next, description will be given of the respective rendering processors.

The rendering processor 1004 includes a group of processor elements arranged in a parallel fashion as shown in FIG. 13, each processor element effecting processing with a pixel including four bits.

Each processor element is connected via the bus 1002 to the frame memory 1005, and all the processor elements are connected to the display processor 1012 only via the bus 1001.

In this embodiment, as shown in FIG. 16, a pixel comprises four work plane bits, the red, green, and blue components each including eight bits, and 16-bit Z component indicating the depth, and the rendering processor 1014 is decomposed into the same processor elements 1014-i (i=1, . . . , 11), which are respectively assigned with the following functions.

The processor element 1004-1 is a processor element controlling four work planes to control the paint-out operation and the cursor blinking.

The processor element 1004-2 controls four frame memory planes to store the four high-order bits RH of the red component 710.

Similarly, the processor elements 1004-3 to 1004-11 respectively control four frame memory planes associated with red, green, and blue components 710–712 and associated with four 4-bit frames related to the Z component 713.

Each processor element is uniquely assigned with an identification signal 1041 indicating the pertinent four planes and hence achieves the operation in response to the identification signal 1041. For example, as shown in FIG. 16, the color and depth specifications for the rendering processor can be with data sent via the 32-bit bus 1001 so as to select, depending on the register address, the 4-bit work plane (WK), the format 720 simultaneously specifying red (R), green (G), and blue (B); the format 721 simultaneously specifying the WK, R, and depth (Z), the format 722 specifying only Z, and the format 723 specifying only WK and R. In this operation, each processor element 1004-i (i=1, . . . , 11) only inputs the data corresponding thereto according to the received identification signal 1041 so as to effect the processing. Namely, in a case of the processor element 10 1004-4 receiving an identification signal which indicates to control four planes corresponding to the four high-order bits GH of the green component 711, only the eight bits from the 8-th bit to the 15-th bit of the format 720 are inputted for the processing.

Figure 18:
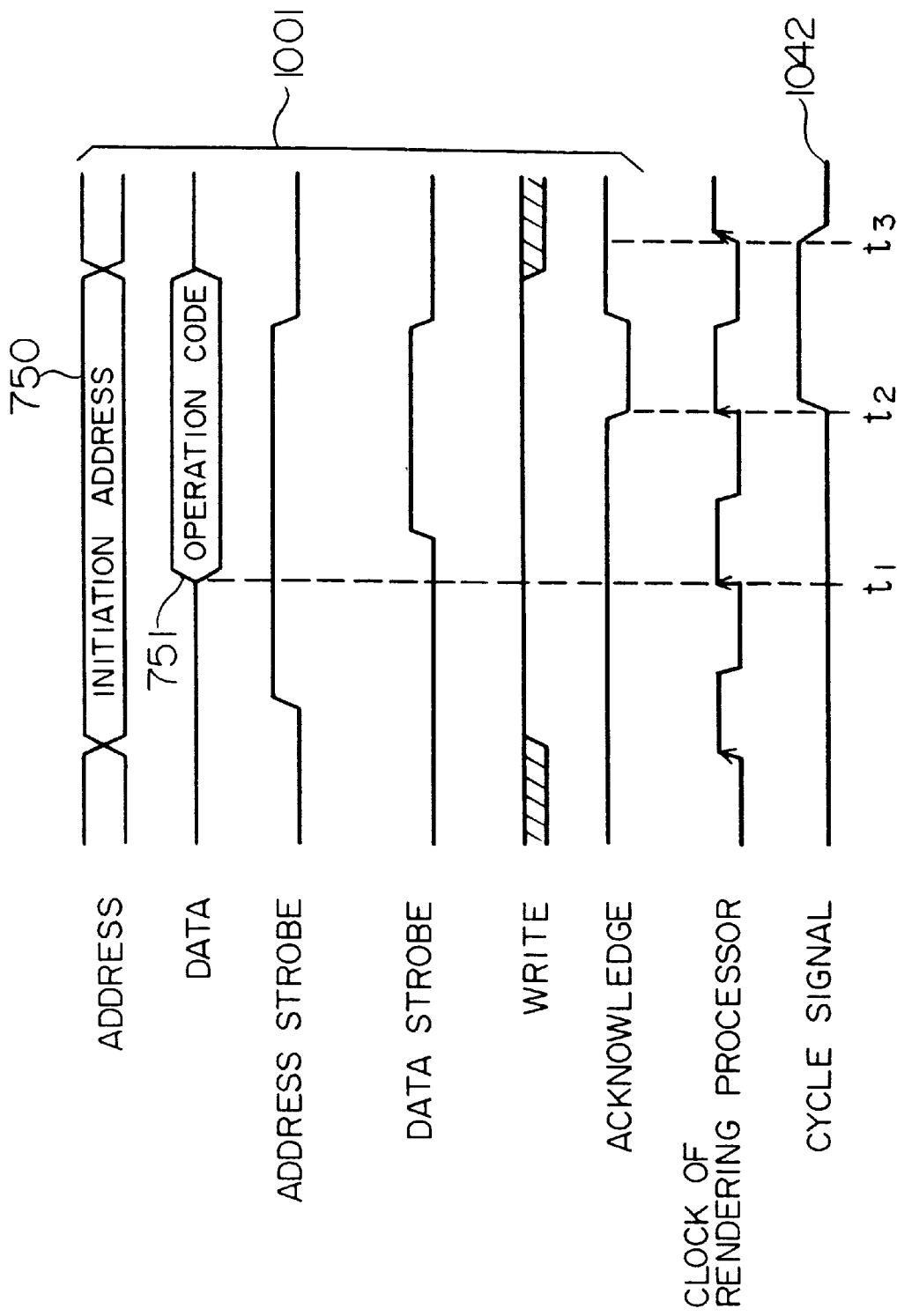
FIG. 18 is a diagram depicting a timing to generate a synchronization signal.

Furthermore, the rendering processors 1004 are provided with a synchronization signal 1042 to enable the respective processor elements 1004-i (i=1, . . . , 11) to operate in a synchronized fashion. The processor element 1004-1 supervising the work plane is set as the master to output the synchronization signal such that the other processor elements 1004-i (i=2, . . . , 11) receive the synchronization signal 1042 for the simultaneous operations. FIG. 18 shows the generation timing of the synchronization signal 1042. The bus 1001 includes a group of signal lines for the address, data, address strobe, data strobe, write, and acknowledge signals. Since the configuration and the operation timing of the bus 1001 is generally known, description thereof will be omitted here. The synchronization signal 1042 is generated when a write access is effected with an initiation address 750 on the processor element 1004-1. First, the address strobe signal indicating that the address signal is valid is kept outputted, the processor element 1004-1 recognizes an occurrence of the initiation at a rising edge $t_1$ of the clock of the rendering processor in the write access with the initiation address specified by the address signal. The clock of the rendering processor, although not shown in FIG. 1 etc., is commonly supplied to all processor elements 1004-i (i=1, . . . , 11). Consequently, the other processor elements 1004-i (i=2, . . . 11) can also recognize the occurrence of the initiation; however, in a case where the operation of the bus 101 is not synchronized with the clock of the rendering processor, the respective processor elements do not necessarily recognize the initiation at the same time. Consequently, the synchronization signal 1042 is outputted at a timing $t_2$ delayed by a clock and is then terminated at the next timing $t_3$. Through the operation to output the synchronization signal 1042 as described above, all the processor elements can simultaneously start processing according to an operation code 751 contained in the data signal while the data strobe signal is being outputted. The operation code is data specifying one of the functions of the rendering processor of FIG. 2.

FIG. 15 shows the internal configuration of each rendering processor which is similar to that of the first embodiment of FIG. 13 excepting that the synchronization signal 1042 is supplied to the elements other than the Z comparator 1026.

The operation of the rendering processor is as follows.

Figure 21:
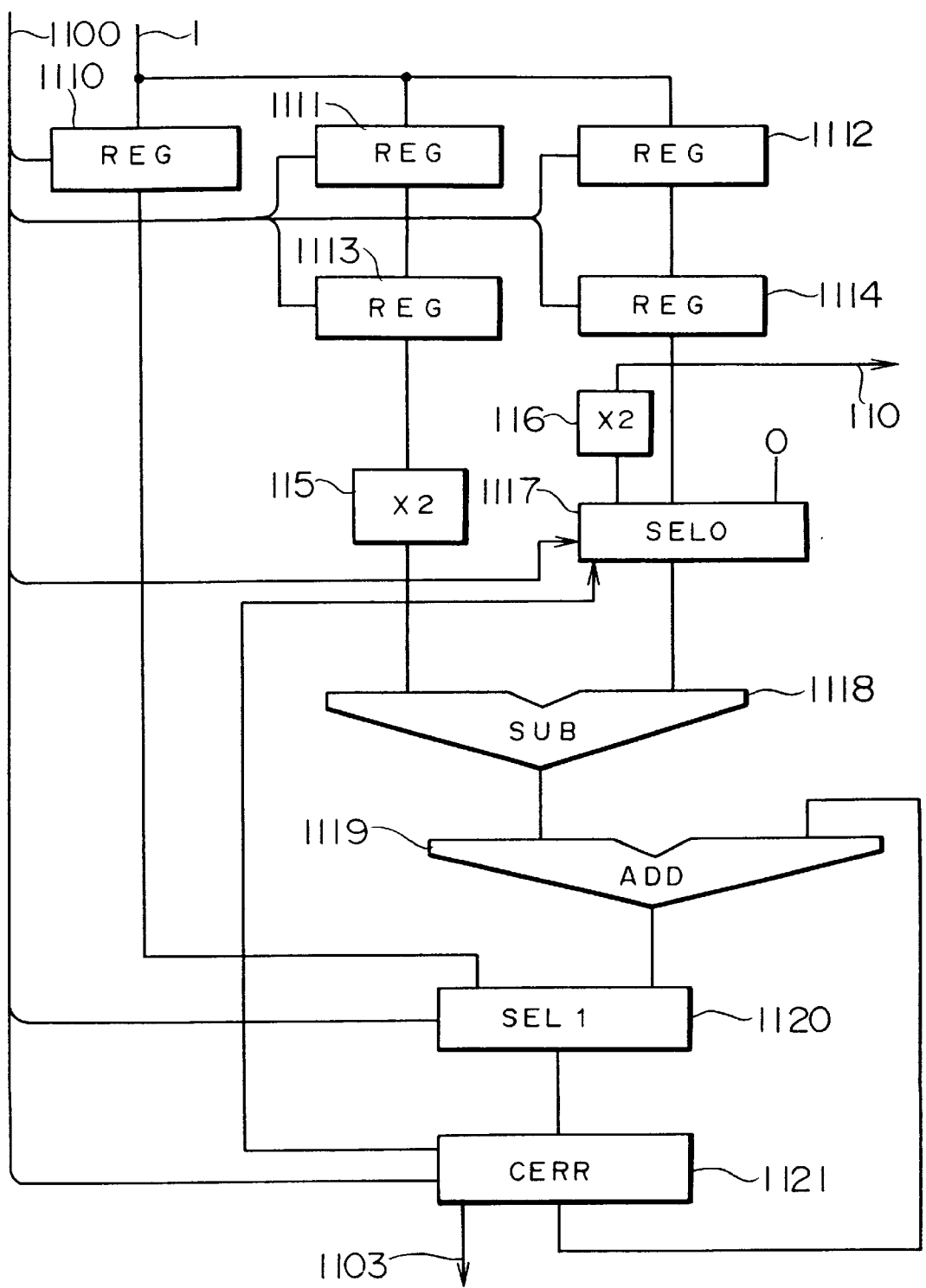
FIG. 21 is a configuration diagram of a DDA for a fraction part.

A command indicating a function of the rendering processor and data associated therewith sent from the display control processor 1012 are set via the bus 1001 to registers in the processor element 1004-i. In the processor element 1004-i, as shown in FIG. 21 for example, the SL-MOD register 111 and the CSL-MOD register 113 constitute a two-stage configuration for the pipeline control, which enables the next command and data to be set even during an operation thereof.

After setting the necessary data into a register, the display control processor 1012 loads the command in a command register disposed in the control section 1021.

For example, in a case where the command effects an expansion of a direct line, the following data is set and then a broken-line expand command is loaded.

1. The start coordinate values (Xs, Ys) of the direct-line expansion are set into registers in the address DDA.
2. Increment values (DX, DY) of the (Xs, Ys) are similarly set into registers in the address DDA.
3. The number of dots for the line expansion is set into a register in the control section 1021.
4. Color information I of the direct line is set into a register in the gradation DDA 1023.
5. Pattern data of the broken line is set into a register in the mask control section 1025.

After the data items above are set, on receiving the command for an expansion of the broken line, the rendering processor effects operations as follows.

1. The four low-order bits (corresponding to an address in 16 pixel of a raster) of the start X coordinate value Xs are decoded such that the mask control section turns the corresponding mask bits off and then color information I of the corresponding pixels is set into registers in the data control section.
2. Computations of $$Xs=Xs+DX$$
$$Ys=Ys+DY$$

are achieved. When Xs exceeds the boundary of the 16 pixels of a raster or when the integer component of Ys is altered, based on the pixel information and mask information generated in the step 1 above, the data is written in the raster in the unit of 16 pixels in the frame memory.

When the conditions above are not satisfied, the processing step 1 is conducted according to new coordinate values (Xs, Ys).

In addition, the number of dots for the line expansion is decremented by one and if the result is 0, the processing is terminated.

Through the controls above data associated with a maximum of 16 pixels constituting a raster can be generated in a register in the data control section so as to be written in the frame memory.

Since the frame memory address is the same in the 16 pixels above, the value attained by removing the four low-order bits of Xs of the coordinate values (Xs, Ys) is transmitted to the frame memory address control section 1024 and is further delivered therefrom to the frame memory 1005 via the bus 1002-1-1.

In a case where the gradation is changed in the direct-line expansion, the display control processor 1012 further sets the change DI of color information to the gradation DDA 1023, thereby achieving the computation of $$I=I+DI$$

in addition to the computation of the coordinates (Xs, Ys).

Furthermore, in a case of the rendering processor controlling the Z plane, since the value of I is used as the Z value, the Z comparator 1026 compares the value with the Z value beforehand read from the frame memory. If the Z value of the frame memory is greater, the mask control section 1025 effects a control to turn the mask bits of the corresponding pixels on.

The outline of the operation of the rendering processor has been described. Next, the operation of each block will be described in detail.

Figure 19:
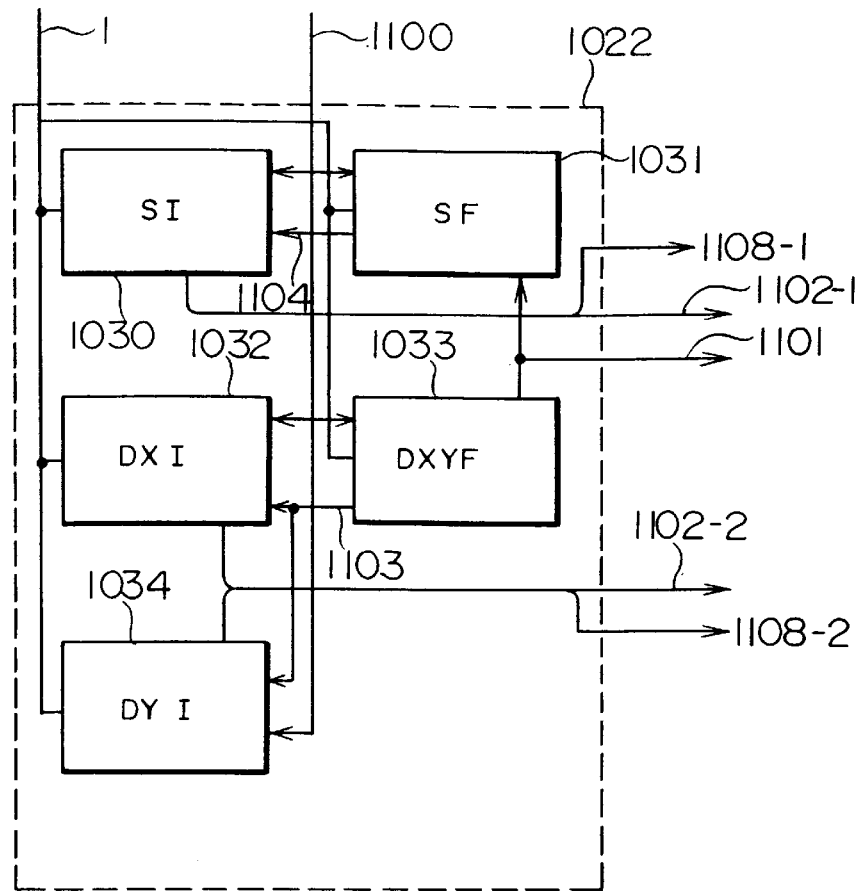
FIG. 19 is a configuration diagram of an adderess DDA.

FIG. 19 is a diagram showing the internal configuration of the address DDA 1022.

The destination coordinates (X, Y) are attained according to the well known Bresenham's DDA algorithm with reference to the longer one of the X and Y axes. The DXI section 1032 or DYI section 1034 assigned to the short axis sequentially computes the integer part by use of the DXYF 1033 computing the carry of the fraction part related to the short axis and the carry signal 1103. In the DXY and DYI sections assigned to the long axis, the respective contents are incremented by one in any cases.

On the other hand, for the source coordinates (X, Y), since the source image only moves in the raster direction, there is disposed an arithmetic unit only for the X coordinate value. Since the long axis of the destination image is used as the reference, the configuration includes an SI section 1030 computing the integer part of the X coordinate and keeping the Y coordinate and an SP section 1031 computing the fraction part of the X coordinate in which the computation is controlled by the carry signal 1104 indicating the carry from the fraction part to the integer part.

The DDA algorithm is generally expressed as follows with reference to the length of the long axis SL, BASE.

$$A = A_0$$
$$SL\_iNT = (A_1 - A_0) \text{DIV } SL\_BASE$$
$$SL\_MOD = (A_1 - A_0) \text{MOD } SL\_BASE$$
$$CERR = IN\_ERR - SL\_BASE$$
$$N = SL\_BASE$$
WHILE $N \neq O$
  DO BEGIN
    $CERR = CERR + 2 * SL\_MOD$
    if $CERR \geq O$ THEN $A + SL\_iNT + 1$
    $CERR = CERR - 2 + SL\_BASE$
      ELSE $A = A + SL\_iNT$
    $N = N - 1$
  END The algorithm of the DDA means that the value of A beginning from $A_0$ is updated the SL_BASE times so as to be $A_1$ as a result. The value of IN_ERR is 0 when $A_0$ is an integer, and when there exists a fraction part, this value indicates the fraction part of the initial value $A_0$ ranging from −SL_BASE to SL_BASE. Furthermore, the value of CERR indicates the fraction part of A during the update operation.

Figure 22:
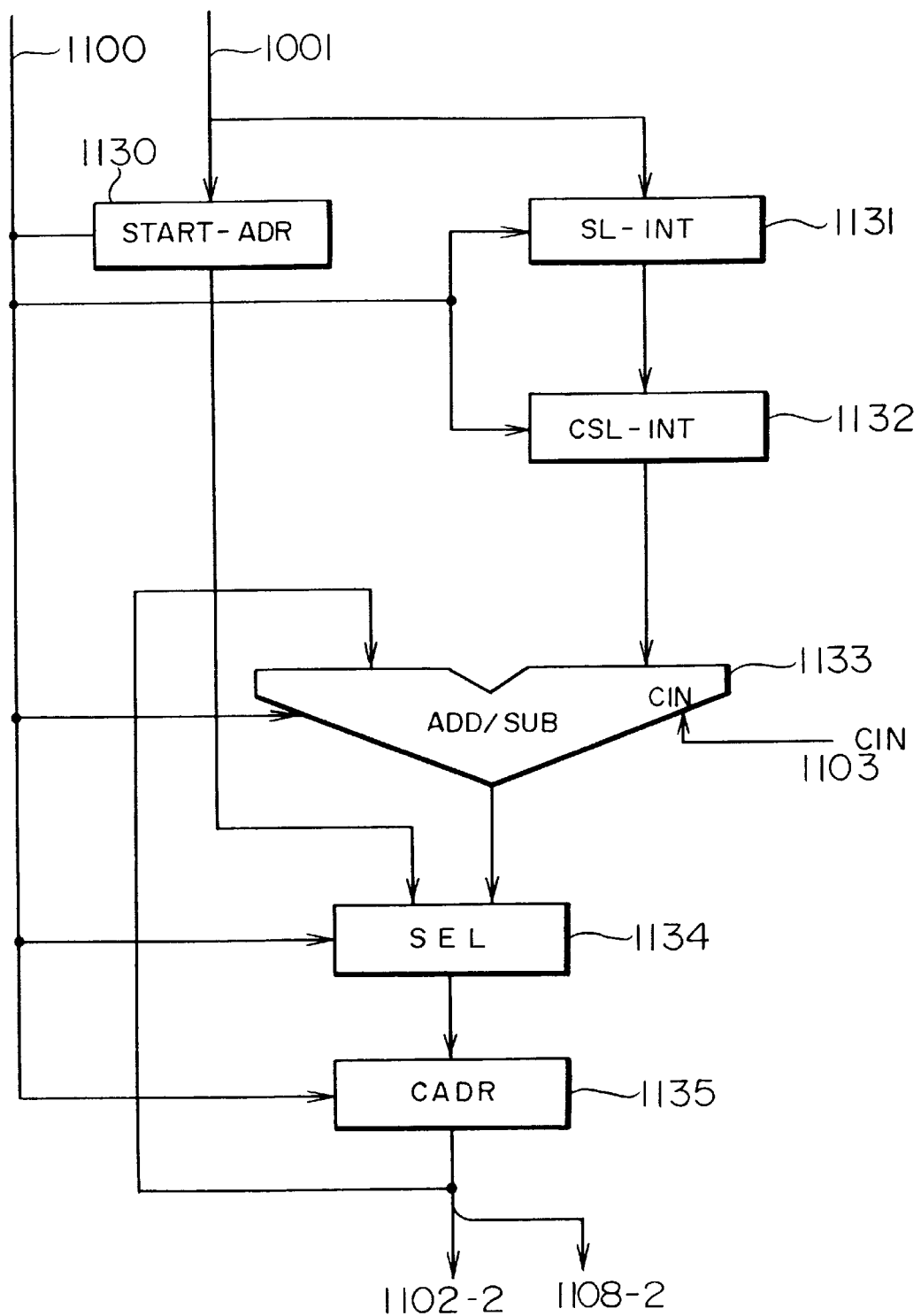
FIG. 22 is a configuration diagram of a DDA for an integer part.
Figure 23:
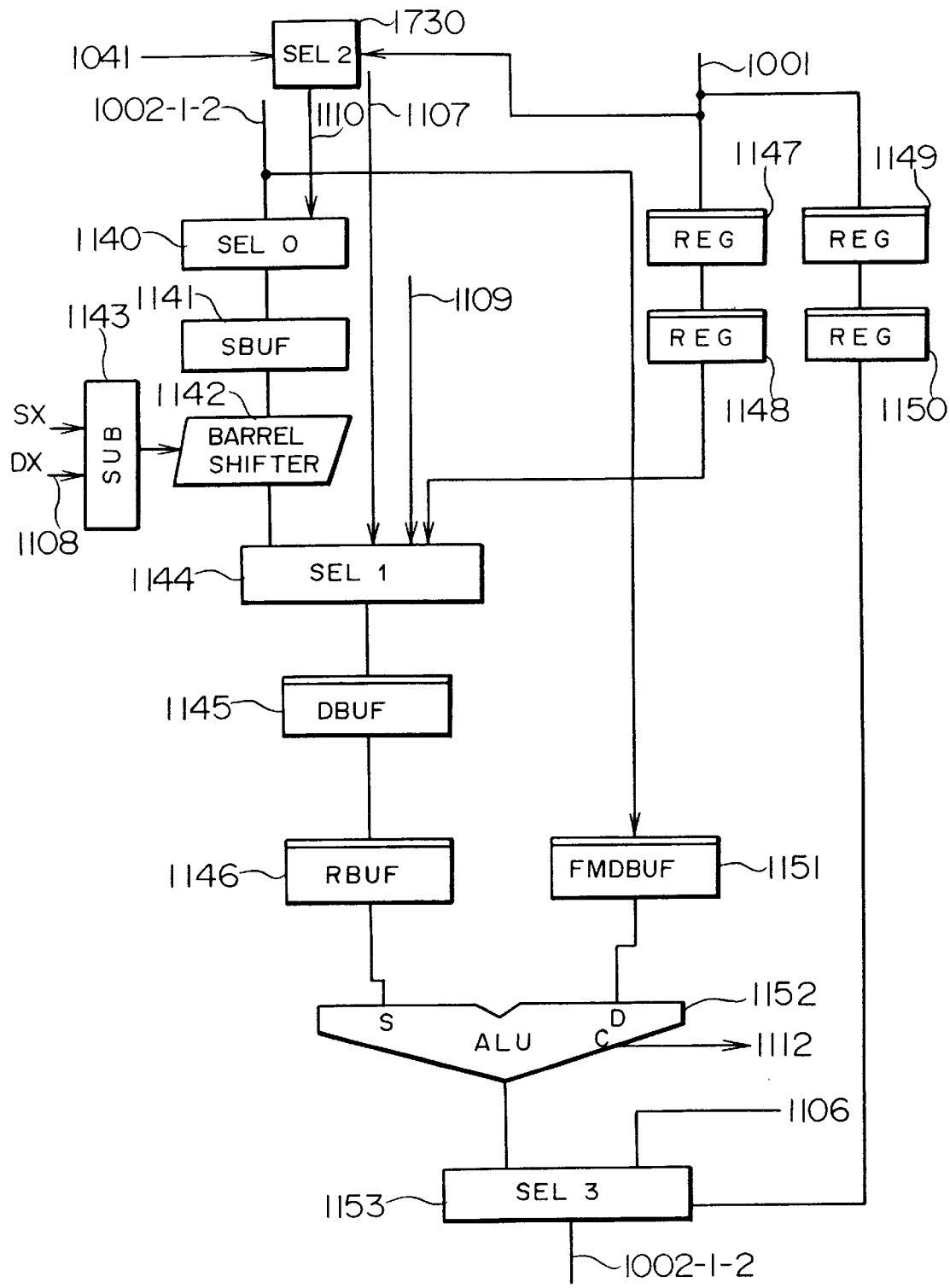
FIG. 23 is a diagram showing the configuration of a data control section.

This algorithm is common to all DDA's computing the destination coordinate values (X, Y) and the source X coordinate values including the R, G, B, and Z components and is implemented by the configurations of FIGS. 21–22.

First, a description will be given of a circuit attaining the fraction part CERR. The display control processor 1012 first supplies via the bus 1001 the initial values including the length of long axis SL_BASE, other axis modulo part SL_MOD, and the fraction part IN_ERR. The registers 1112, 1111, and 1110 respectively corresponding to the parameters above are dedicatedly allocated independently of the registers 1114, 1113, and 1121 to be used in the operation; consequently, data can be set into the registers above during the operation of the previous command, and the respective set signal is supplied as the control signal 1100 from the control section 1021.

When the current execution of the DDA computation is completed and the display control processor 1012 sets a command to a command register, the control section 1021 sets in response to the control signal 1100 the contents of the initial value registers 1110, 1111, and 1112 to the current registers 1121, 1113, and 1114.

Thereafter, the content of the CERR 1121 is updated in response to the control signal 1100 such that the computation of the CERR of the DDA expression is executed and the carry signal 1103 is outputted.

In the DDA circuit associated with the integer part, the start point coordinates and the integer part of the bias value for the next point are set to the CADR register 1135 and the CSL_INT register 1132 in the same fashion as in the case of the first embodiment.

Thereafter, in synchronism with the operation of the fraction part, the following computation is effected in response to the carry signal 103.

$$CADR=CADR+CSL\_INT+CIN$$

For the destination coordinates (X, Y), since the long axis is assigned as the reference in any case, CLS INT is 0 or −1; however, the basic operation is the same.

Figure 20:
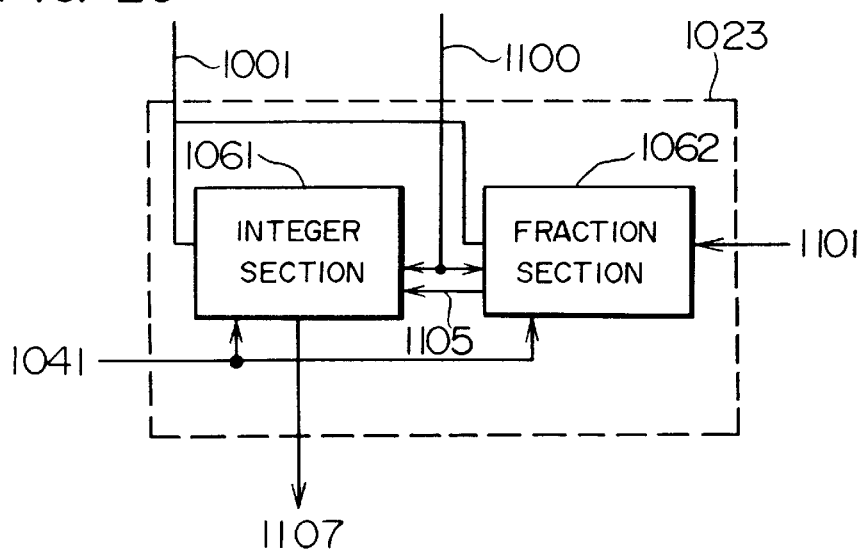
FIG. 20 is a configuration diagram of a gradation DDA.

FIG. 20 shows the configuration of the gradation DDA 1023. The gradation DDA 1023 includes an integer section 1061 and a fraction section 1062, and is similar to that of the first embodiment of FIG. 6 excepting that there is disposed a synchronization signal 1041 for a synchronized operation.

Next, a description will be given of the configuration of the data control sections 1027. In order to control four planes, four data control units 1027-1 to 1027-4 are disposed in the four processor elements; however, these units are basically of the same configuration, and hence one of the data control units will be described with reference to FIG. 23.

In a case where a source image is required to be supplied from the frame memory, for example, for an affine transformation including a rotation of an image, a read operation is achieved via the bus 1002-1-2 on the frame memory so as to set data associated with 16 pixels to the SBUF register 1141.

When a source image is to be supplied from the display control processor, an access is effected according to the format of FIG. 17 such that the selector SEL2 1730 selects, according to the identification signal 1041, from the data on the bus 1001 a bit corresponding to the frame memory plane to be controlled and outputs the bit as the pixel signal 110 to be set into the SBUF register 1141.

The data thus set is shifted into the barrel shifter 1142 by a value obtained by effecting a subtraction in the subtractor 1143 between the four low-order bits of the source X coordinate generated by the address DDA and the four low-order bits of the destination X coordinate. This processing is effected in order to align the position of the source image in the unit of 16 pixels with the position of the destination image in the 16-pixel unit so as to locate the data in the same 16-bit bus.

The result of the shift operation is set as follows via the selector SEL1 1144 to the DBUF register 1145, namely, for the source of which the bits obtained by decoding the four low-order bits of the destination X coordinate and which is to be set the DBUF register 1145, in a case of a command using the output 1107 from the gradation DDA 1023, the output 1107 from the gradation DDA 23 or the output from the CBACK_COL register 1148 storing the background color is selected according to the pattern data 1109, thereby setting the data into the DBUF register 1145.

In this operation, for the SBUF register 1141, the same content is used until a carry occurs from the four low-order bits of SX to the higher-order position.

Furthermore, pixels are continuously written in the DBUF register 1145 until a carry occurs from the four low-order bits of the destination X coordinate to the higher-order position or the content of the destination Y coordinate is altered, and then the content of the DBUF register 1145 is set to the RBUF register 1146.

The control section 1021 effects the control above in response to the signal 1121 from the address DDA circuit, which enables the processing to be executed in a minimized circuit to access the frame memory so as to effect a high speed operation. The access to the frame memory is achieved as follows. Namely, after the RBUF register 1145 is updated as described above, the destination image is read into the FMDBUF register 1151 so as to effect computation thereon in the ALU 1152; furthermore, the mask data 1106 generated by the mask control section and the destination image thus read are fed to the selector 1153, which in turn selects data 1002-1-2 to be read in the frame memory. The selection of the destination image data by use of the mask data is achieved because the recent dual port memory is constructed to receive the mask data and the ordinary data in a time sharing fashion, and hence the operation is effected in synchronism with the timing of the dual port memory. The selection signal and the device to generate the selection signal will not be described.

On the other hand, for the BACK_COL register 1147 storing the background color and the PL_COL register 1149 controlling the write mask for each plane, there is disposed a bit for each plane. The content of the former is set into the DBUF register 1145 as data corresponding to 0 of the pattern data 1109, whereas the latter is used as a control signal for the selectors SELL 1144 and SEL3 1153 so as to entirely mask the write operation on the pertinent plane.

Furthermore, the gradation information 1107 from the gradation DDA is controlled so as to be set into the DBUF register 1145 as data corresponding to 1 of the pattern data 1109.

The operation of the data control section 1027 has been described. Since the generation of the image data to the DBUF register 1145 and the access to the frame memory beginning from the operation of the RBUF register 1146 can be effected through a pipeline processing, during the frame memory access, processing to set pixel information into the DBUF register 1145 can be repeatedly achieved for data of a maximum of 16 pixels and hence the processing speed is increased.

Figure 24:
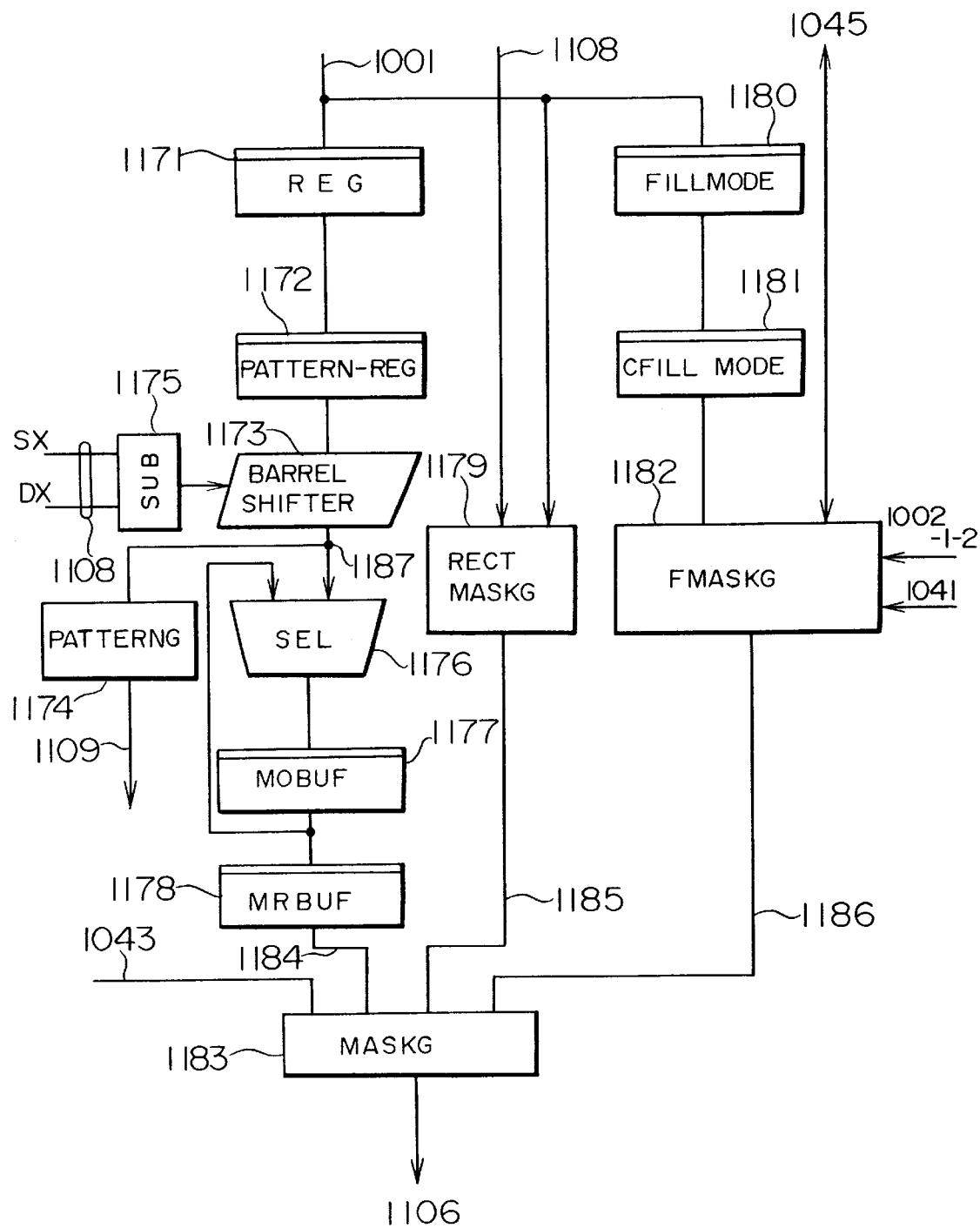
FIG. 24 is a diagram showing the configuration of a mask control section.

FIG. 24 shows the configuration of the mask control section MASKC 1025, which operates in response to the synchronization signal 1042. The content of the mask control is substantially identical to that mask control of the first embodiment.

In the mask control section 1025, the mask data generated in the HDBUF register 1177 is loaded into the MRBUF register 1178 at the same timing when the data control section 1027-i sets the content of the DBUF register 1145 into the RBUF register 1146, and immediately thereafter the DBUF register 1145 is cleared.

Through the operation above, there can be generated pattern mask data 1184 corresponding to an access to the frame memory.

As the pattern data 1109 to the data control section 1027, the data on the bus 187 is transmitted through the driver 1174.

The generation of the rectangular mask signal for the raster operation and the generation of the paint-out signal are effected in the similar fashion to those described in conjunction with the first embodiment.

Next, a description will be given of the content of the Z comparator 1026.

In the Z comparison, the 16-bit Z value stored in the RBUF register 1146 is compared with the Z value previously stored in the Z plane of the frame memory such that only for the pixels for which the former is greater, the pixels set to the RBUF register 1146 are written in the frame memory.

In order to compare the 16-bit data, the processor element 1004-i (i=8, . . . , 11) includes a carry preread circuit effecting an operation to beforehand read the carry in the unit of a bit, and the propagation carry signal 1112 is a propagation carry associated with the subtraction of the bit above. The Z comparator 1026 receives as an input the propagation carry 1112 for each bit so as to generate a carry signal 1044o to the high-order processor element by using the carry signal 1044i from the low-order processor element.

When the carry signal 1044i of the processor element 1004-8 is set to 0, the carry signal 1044o of the processor element 1004-11 becomes to represent the result of the Z comparison. This carry signal 1044o is connected as the mask signal 1043 to all processor elements. The Z comparison is achieved for 16 pixels, namely, the carry signals 1044i and 1044o and the mask signal 1043 each comprise 16 bits.

Figure 25:
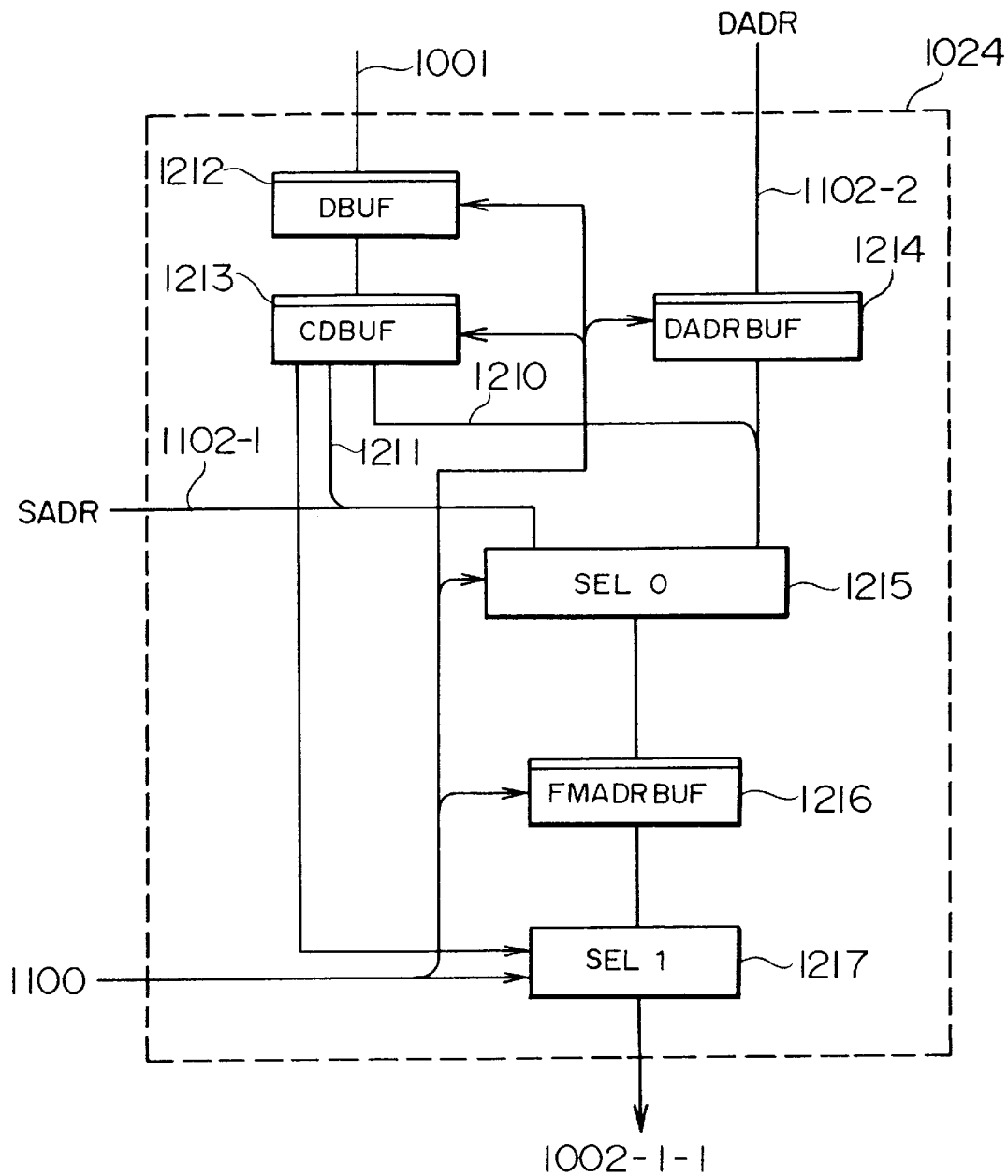
FIG. 25 is a diagram illustrating the configuration of a frame memory address control section.

FIG. 25 shows the configuration of the frame memory address control section FMAC 1024. Except for the fact that the control signal 1100 is supplied from the processor control section 1021 for the control thereof, the constitution of FMAC 1024 is identical to the frame address control section FMAC 24 of the first embodiment of FIG. 1, and the control thereof is similar to that of the first embodiment.

According to the embodiment, one of a plurality of processor elements is specified as a master processor element, which outputs a synchronization signal to the other plural processor elements such that all the processor elements start processing at the same time; consequently, also in the processing such as the blinking, a disturbance on the screen can be prevented and hence a drawing operation can be accomplished with a high precision. Furthermore, since all processor elements simultaneously start the processing, concurrent processing is possible, thereby implementing a high-speed processing.

In addition, an identification signal is assigned to a processor element of a kind so as to effect an operation depending on the identification signal. This provision leads to a multi-rendering processor system in which the respective processor elements simultaneosuly execute a different processing. As a result, for various display levels (for example, 2-dimensional 256-color display, 3-dimensional 256-color display, 3-dimensional 16-million color display, etc.), the processing can be realized, as for the hardware, only by increasing the number of processor elements of a kind and by adding the pertinent identification signals, thereby leading to an effect that the expandability of the system is improved.

Figure 28:
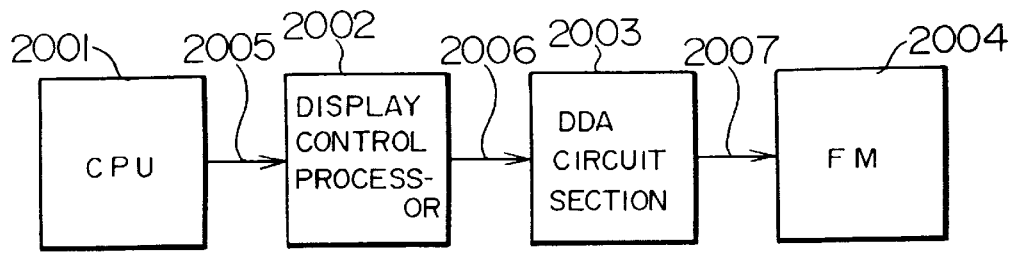
FIG. 28 is a diagram illustrating the overall configuration example of a display apparatus effecting a luminance conversion of gradation information according to the present invention.

FIG. 28 shows an embodiment of the configuration of a display apparatus effecting a luminance change of gradation information according to the present invention.

Figure 26:
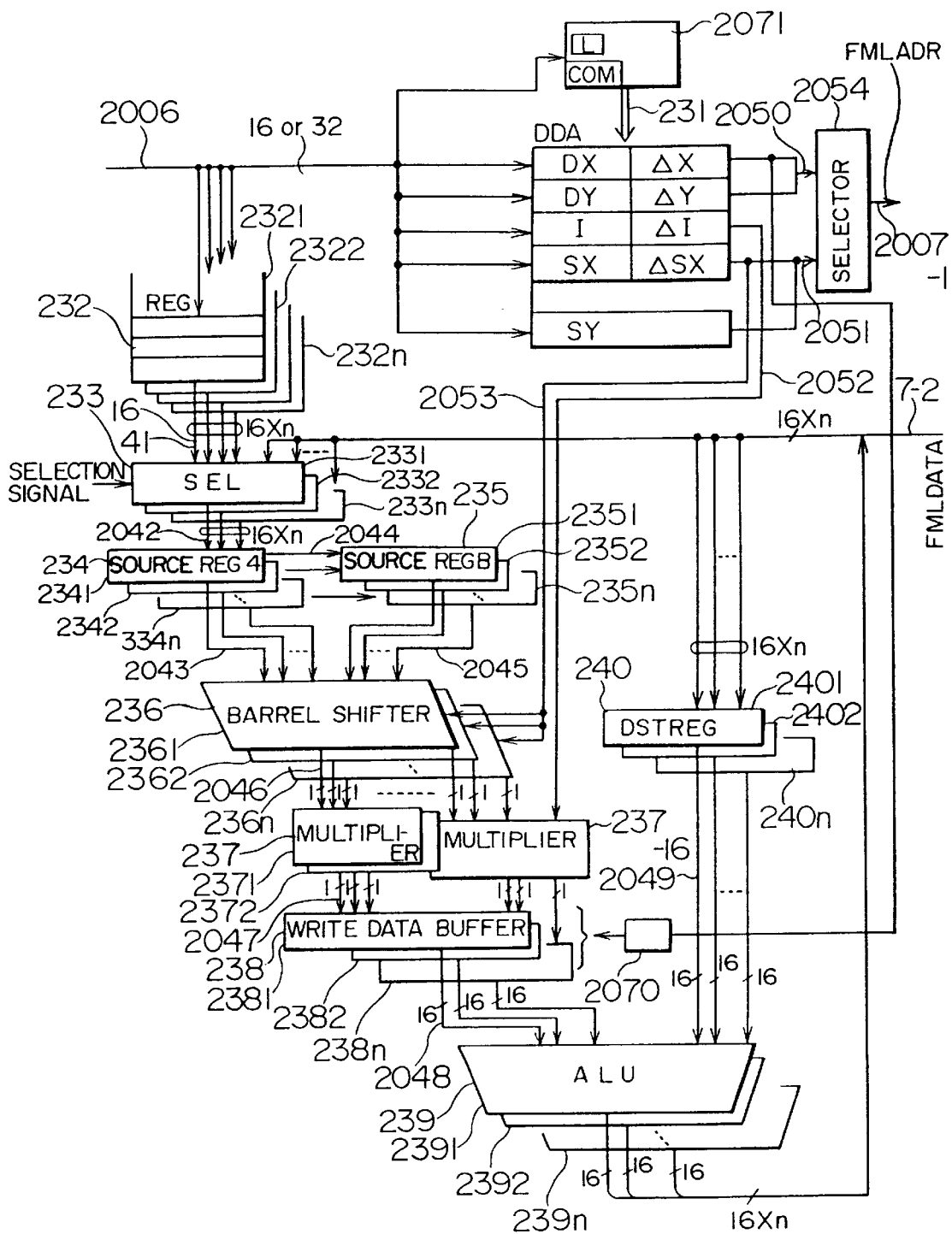
FIG. 26 is a diagram illustrating an embodiment of a DDA circuit section in a display apparatus effecting a luminance conversion of gradation information according to the present invention.
Figure 27:
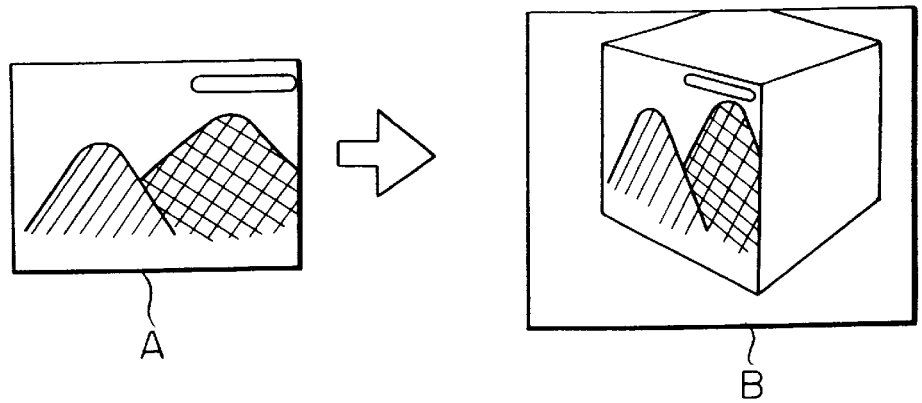
FIG. 27 is a diagram showing an example of the conventional graphic transformation processing.

FIG. 26 shows an embodiment of the DDA circuit configuration which is most characteristic in the embodiment of FIG. 28.

In FIG. 28, a CPU 2001 is a host processor which instructs via a bus 2005 an image transformation and drawing of graphics to a display processor 2002.

The display control processor 2002 subdivides the contents received via the bus 2005 into data units which can be processed by the DDA circuit section 2003 and passes the resultant data units via a bus 2006 to the DDA circuit section 2003.

The DDA circuit section 2003 computes the gradation value for each pixel and writes the obtained value via a bus 2007 in a frame memory (FM) 2004.

The contents of the FM 2004 are continually refreshed so as to be continuously displayed on the display (not shown). Consequently, the operator can observe the image thus generated in a real-time fashion in any case.

Figure 29:
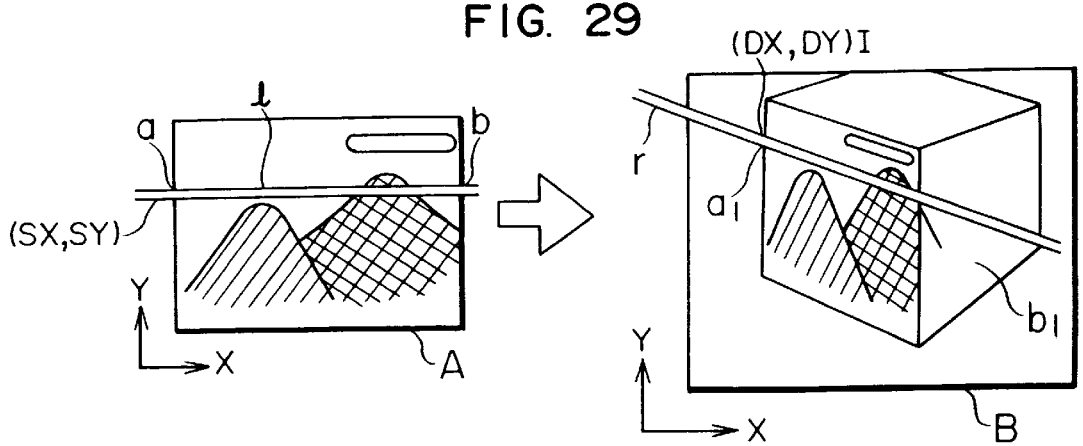
FIG. 29 is a diagram depicting an example of a graphic transformation processing according to the present invention.

A processing example associated with FIG. 26 will be briefly described by use of a graphic example of FIG. 29.

In FIG. 29, there is shown an example in which a graphic image A on the left side is transformed into a graphic image B on the right side. The graphic images A and B are two-dimensional and three-dimensional images, respectively, and in this processing, the graphic image A is fixed onto a side surface in the graphic image B.

In this processing, the CPU 2001 first instructs a mapping operation to include the graphic image A on the left side in a portion of the graphic image B as shown on the right side. This instruction is transmitted via the bus 2005 to the display control processor 2002.

The display control processor 2002 effects a raster scan on the graphic image A. For each raster scan line, as indicated by a scan line l of FIG. 29, there are specified a start point (SX, SY) of the scan line l, the destination coordinates (DX, DY) corresponding to the start point (SX, SY), the luminance information I ($0 \leq I \leq 1$), and displacement values $\Delta SX$, $\Delta X$, $\Delta Y$, and $\Delta I$ of SX, DX, DY, and I with respect to the next point.

The destination coordinates (DX, DY) here are the corresponding values of coordinates of the graphic image A in the graphic image B, and the next point associated with SX, DX, DY, and I means the next scan point in the scan line l in the horizontal direction (X direction). Namely, assuming that the start point is, for example, the current scan point, the next point indicates the scan point next to the start point. In general, the scan pitch is constant in the X direction.) There is disposed $\Delta SX$, however $\Delta SY$ is unnecessary. This is because the Y coordinate is not changed in a scan line l. DX and DY are however provided because the scan line l is transformed into a direct line r on the graphic image B and the X and Y coordinate values change on the line r. Furthermore, in addition, the start points a and b are transformed to be a1 and b1, respectively. Moreover, the scan line l is inclined from the upper-left position to the lower-right position in the graphic image B with a constant change in the Y coordinate value. The number of the scan lines is previously determined.

The display control processor 2002 sends the data SX, SY, I, DX, DY, ΔSX, ΔX, ΔY, and ΔI to the DDA circuit section 2003.

Based on the data thus received, the DDA circuit section 2003 computes the coordinates and gradation on the line r for each pixel. The resultant coordinates and gradation are stored in the frame memory 2004. When the data items stored in the frame memory 2004 are displayed, there is attained a graphic image where the graphic image A is fixed on a side surface in the graphic image B as shown in FIG. 29.

Next, a description will be given of the embodiment of FIG. 26.

Figure 30:
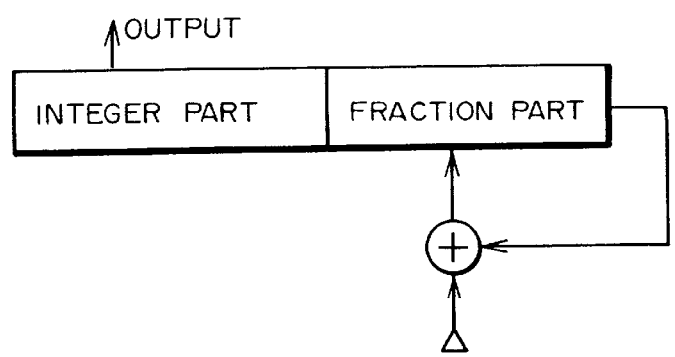
FIG. 30 is a functional diagram showing an example of a DDA circuit.

DDA 31: In this configuration, DDA 2031 is of a symmetric type. FIG. 30 shows the functional diagram of the DDA of the symmetric type. With a numeric value set as a start point, a small value Δ is successively added thereto such that the integer part is sequentially outputted for each addition result. The output integer value is assigned as the change value to be used for the transformation from the start point to the end point. FIG. 30 schematically shows the function. The small value Δ is added to the fraction part such that the resultant value replaces the previous fraction value. For each replacement, the pertinent integer value is outputted. Incidentally, there exist cases where the integer part is updated and where the integer part is not updated as a result of the replacement. In the case associated with the update of the integer value, the addition of the small value Δ to the fraction part results in an integer 1; whereas the integer 1 is not attained in the case where the integer part is not updated. Namely, a carry takes place in the former case and a carry is not generated in the latter case.

The start point here is associated with the values SX, DX, DY and I, whereas the small value Δ is related to the values ΔSX, ΔX, ΔY, and ΔI. The value of SY does not change with respect to an arbitrary scan line l, namely, Δ=0 and this value is unnecessary for the computation. For the five data items above including SX, DX, DY and I, the processing of FIG. 30 is respectively accomplished, namely, the data update toward the end point is respectively effected on the five data items.

Register 232: This register comprises n plane registers 2321, 2322, . . . , 232n. Each register is of a FIFO type and has a capacity of 16 bits Xm.

The value n indicates the number of bits constituting a pixel, the 16 bits are transferred at one time, and the value m is the number of the registers which the FIFO UNITS. Consequently, the value m determines the capacity of each FIFO register. In usual examples, the value of n is 4, 8, or 16. For the greater value of n, the number of gradation levels can be increased. In place of 16-bit operation, there are also employed the 8-bit and 32-bit operations in some cases.

The register 232 is loaded via a bus 2006 with the image data in the first-in (FI) fashion.

Selector 233: This register includes n selectors 2331 to 233n operates to select either the output from the register 232 or the data read from the frame memory (FM) 2004 depending on a selection signal. The selection signal indicates the selection of the first-out (FO) output from the register 232 when the address (SX, SY) specifies an address of the main memory and indicates the selection of the output (FM DATA via the bus 2007-2) from he frame memory when the address (SX, SY) specifies an address of the frame memory. The selectors 2331–233n of the selector 2033 correspond to the registers 2321–232n, respectively.

Furthermore, the registers 2331–233n correspond to 16×n of the FM DATA output from the bus 2007-2.

Source registers 234–235: These registers comprises n registers 2341–234n and n registers 2351–235n are provided for 32 pixels and effects 16-pixel buffering operations. The capacity of 32 pixels is disposed for an operation to generate data shifted by 16 pixels. These registers achieve operations such that data is first latched into the register 234, the data is sent to the register 235 so as to be latched therein, and then new data is latched into the register 234.

Barrel shifter 236: This shifter comprises n barrel shifters 2361–236n. The barrel shifter 236 has a function to shift a plurality of bits at a time.

Multiplier 237: This multiplier includes 16 multipliers 2371 to 237-16 each corresponding to a pixel. The multiplication is accomplished between information I and the pixel data.

Write data buffer 238: This buffer comprises n buffers 2381–238n. The write control is effected depending on the decode result of the four low-order bits of DX. The decode operation is achieved by a decoder 2070.

Arithmetic logic unit 239: This unit includes n ALU's.

Control circuit 1071: This control unit effects the DDA control. Of the functions shown in FIG. 5, the number L of loops is specified and the start command COM is set. If COM INDICATES THE START, THE DDA computation is repeatedly accomplished until L=0 results. If FM read/write is instructed, a read or write operation is achieved on the FM. The FM write condition is represented by (the integer part of DY is changed) ⊕ (the value of DY exceeds the memory boundary). Furthermore, the occurrence that the value of DY exceeds the memory boundary is recognized when a carry occurs from the four low-order bits to the fifth bit of DX and the 16-pixel unit aligns at the boundary of the frame memory.

Destination register DSTREG 240: This register includes n registers 2401–240n.

In the configuration of FIG. 26, the components 232–236 and 238–240 are of the n-plane configuration for a purpose that when an image includes pixels each comprising n bits, the n-bit plane can be commonly processed in the unit of the plane, thereby enabling a concurrent processing. However, for the multiplier 237, since the carry propagation is generated between planes, a multiplier is disposed for each pixel.

Next, the operation of the configuration of FIG. 26 will be described.

The parameters SX, SY, DX, DY, I, ΔX, ΔY, ΔSX, and ΔI supplied via the bus 2006 are set to registers in the DDA circuit 231.

When the raster beginning from (SX, SY) exists in the frame memory 2004, the selector 2054 delivers the address of (SX, SY) as an address for the frame memory 4 via the bus 2007-1 for an access to the FM 2004. Data read from the address of the FM 2004 is sent via the bus 2007-2 and is then selcted and fetched by the selector 233.

On the other hand, when the raster beginning from (SX, SY) exists in the main memory on the side of the CPU 1, the read data is sequentially written via the bus 2006 in the FIFO register 232. The selector 233 fetches the data from the register 232 in the FO fashion.

The data attained from the selector 233 includes 16-pixel data. Since a pixel comprises n bits, the data of 16 pixels corresponds to 16×n bits.

The data selected by the selector 233 is latched into the source register SOURCE REG 234 and is then passed to the register 235. Information of 2×16×n bits is latched by use of the registers 234–235.

The barrel shifter 236 shifts the data received from the registers 234–235 depending on the content of the four low-order bits (indicating the pertinent position in the width of 16-bit bus) stored in the SX register of the DDA. The resultant data is multiplied for each unit, in the multiplier 237, by the value I stored in the DDA indicating luminance information. The result of the multiplication is temporarily stored in the write data buffer 238. Data of 16 pixels is stored at a time.

Incidentally, since the FM 4 and the like generally handle the address in the unit of a word, there exists a difference of a bits ($0 \leq \alpha \leq 15$ when a word includes 16 bits) between the source data and the corresponding destination data. These data items are aligned by use of circuit elements 234–236. Namely, an a-bit shift is accomplished by the shifter 236, and the registers 234–235 keeps two words of source data so as to generate 1-word data even when the α-bit shift is effected.

On the other hand, since the frame memory address for the write operation is supplied by an output 2050 from the DDA 231 associated with DX and DY, the address is delivered through the selector 2054 as the address 2007-1 to the FM 4 so as to access the FM 2004. Data read by this access is set via the bus 2007-2 to the destination register 240 (for 16 pixels).

The final write data is attained through the simultaneous 16-pixel computation of the arithmetic logic unit 239 on the contents of the write data buffer 238 and the destination register 240. The resultant data is written via the bus 2007-2 in the FM 2004.

For the write operation of the computation result in the FM 2004, since the write pattern of the source data is associated with a bit boundary and the FM 2004 is accessed in the word unit, if the data is directly written in the FM 2004, the original data is destroyed. To prevent the destruction of the write data, there is necessary a merge processing to be effected between the register 240 from which the original destination data is read and the write data buffer 238 in which the data is written. For this purpose, the arithmetic logic unit 239 is disposed.

Incidentally, although the processing of the DDA 231 has already been described, the operation is expressed as follows, namely, the following computation is executed for each instruction.

$$DX \leftarrow DX + \Delta X$$
$$DY \leftarrow DY + \Delta Y$$
$$I \leftarrow 1 + \Delta I$$
$$SX \leftarrow SX + \Delta SX$$
$$SY \ldots \text{constant}$$

As a result, the address and luminance information of the next pixel to be written and the address of the source pixel to be written can be computed in the unit of a pixel.

According to the present embodiment, since a multiplication of data associated with a maximum of 16 pixels can be accomplished at a time, if the sizes of the source and destination images are unchanged and the luminance information is constant, the computation for 16 pixels can be carried out at a time and hence the processing speed is further increased.

Incidentally, the 16-pixel operation is described only as an example, namely, the 8-pixel operation, 32-pixel operation, and the like are also possible.

According to the present invention, the image data including gradation information can be converted by use of luminance information sequentially computed, thereby enabling the user to generate an image which is displayed with different luminance levels on a display according to the magnitude of illumination.

While the present invention has been described with reference to the particular illustrative embodiment, it is not restricted by those embodiments but only by the appended claims. It is to be appreciated that those skilled in the art can change and modify the embodiments without departing from the scope and spirit of the present invention.

What is claimed is:

1. A data processing apparatus for displaying gradation information comprising:

a CPU;

a memory for storing first gradation information which make up a source image to be displayed; and a processor for interpolating a luminance level of pixels to be displayed, reading said first gradation information of said source image to be displayed from said memory, computing second gradation information to be displayed based on said luminance level and said first gradation information, and storing said second gradation information to be displayed to said memory as said first gradation information for use in subsequent computings of second gradation information to be displayed.

2. A data processing apparatus according to claim 1, wherein said first and second gradation information each includes a pixel having plural bits.

3. A data processing apparatus according to claim 2, wherein said plural bits of each pixel represent color.

4. A graphic processing apparatus comprising:

a first interface for inputting a command for a CPU;

a second interface for connecting memory having stored therein gradation information of a source image to be displayed;

a register for storing said gradation information of said source image to be displayed input via said second interface; and a circuit for interpolating a luminance level of pixels to be displayed, inputting said gradation information of a source image to be displayed stored in said register, computing gradation information to be displayed of a destination image based on said luminance level and said gradation information of said source image to be displayed, and outputting said gradation information to be displayed of said destination image to the memory via said second interface as said gradation information of a source image to be displayed for use in subsequent computing of gradation information to be displayed.

5. A data processing apparatus according to claim 4, wherein said first and second gradation information each includes a pixel having plural bits.

6. A data processing apparatus according to claim 5, wherein said plural bits of each pixel represent color.

7. A data processing apparatus for displaying gradation information comprising:

a CPU;

a memory for storing first gradation information which make up a source image to be displayed; and a processor for interpolating a luminance level of pixels to be displayed, reading said first gradation information of said source image to be displayed from said memory, computing second gradation information to be displayed based on said luminance level and said first gradation information, and storing said second gradation information to said memory as said first gradation information for use in subsequent computings of second gradation information to be displayed, wherein said processor comprises:

a register for storing said first gradation information from said memory, and a circuit, including at least a multiplier, for interpolating said luminance level for pixels to be displayed, reading said first gradation information of said source image to be displayed from said memory, computing said second gradation information to be displayed based on said luminance level and said first gradation information, and storing said second gradation information to be displayed in said memory as said first gradation information for use in subsequent computings of second gradation information to be displayed.

8. A data processing apparatus according to claim 7, wherein said first and second gradation information each includes a pixel having plural bits.

9. A data processing apparatus according to claim 8, wherein said plural bits of each pixel represent color.

10. A data processing apparatus for displaying gradation information comprising:

a CPU;

a memory for storing first gradation information which make up a source image to be displayed;

a graphic processor which includes a first processor for interpolating a luminance level of pixels to be displayed, and a second processor for reading said first gradation information of said source image to be displayed from said memory, computing second gradation information to be displayed based on said luminance level and said first gradation information, and storing said second gradation information to be displayed to said memory as said first gradation information for use in subsequent computings of second gradation information to be displayed; and a display for displaying the content of said memory.

11. A data processing apparatus according to claim 10, wherein said first and second gradation information each includes a pixel having plural bits.

12. A data processing apparatus according to claim 11, wherein said plural bits of each pixel represent color.

13. A data processing apparatus for displaying gradation information comprising:

a CPU;

a frame memory for storing first gradation information which make up a source image to be displayed;

a memory for storing programs to be executed by said CPU and said first gradation information which make up said source image to be displayed; and a processor for interpolating a luminance level of pixels to be displayed, reading said first gradation information of said source image to be displayed from said memory, computing second gradation information to be displayed based on said luminance level and said first gradation information, and outputting said second gradation information to be displayed as said first gradation information for use in subsequent computings of second gradation information to be displayed; and a selector which selectively supplies said second gradation from said processor to said frame memory or said memory.

14. A data processing apparatus according to claim 13, wherein said first and second gradation information each includes a pixel having plural bits.

15. A data processing apparatus according to claim 14, wherein said plural bits of each pixel as represent color.

* * * * *